US012793611B2

(12) United States Patent
Yoon et al.

(10) Patent No.: US 12,793,611 B2
(45) Date of Patent: Nov. 10, 2026

(54) ELECTRONIC DEVICE

(71) Applicant: Samsung Display Co., Ltd., Yongin-Si (KR)

(72) Inventors: Changnoh Yoon, Yongin-si (KR); Sangan Kwon, Yongin-si (KR); Jihye Kim, Yongin-si (KR); Hongsoo Kim, Yongin-si (KR); Namjeong Kim, Yongin-si (KR); Jiyoun Kim, Yongin-si (KR); Haneul Kim, Yongin-si (KR); Sukhun Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/959,627

(22) Filed: Nov. 26, 2024

(65) Prior Publication Data

US 2025/0329291 A1 Oct. 23, 2025

(30) Foreign Application Priority Data

Apr. 22, 2024 (KR) ........................ 10-2024-0053078

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/0232* (2013.01); *G09G 2320/0233* (2013.01); *G09G 2320/068* (2013.01); *G09G 2358/00* (2013.01); *G09G 2360/16* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 8,207,917 | B2 * | 6/2012 | Mitsuru | G09G 3/3208 345/82 |
| 11,211,008 | B2 | 12/2021 | Park et al. | |

(Continued)

FOREIGN PATENT DOCUMENTS

| | | | |
|---|---|---|---|
| KR | 10-2018-0072910 | A | 7/2018 |
| KR | 10-2289274 | B1 | 8/2021 |

(Continued)

*Primary Examiner* — Patrick N Edouard
*Assistant Examiner* — Peijie Shen
(74) *Attorney, Agent, or Firm* — Innovation Counsel LLP

(57) ABSTRACT

An electronic device is disclosed that includes a display panel in which a first area, a second area, and a border area are defined, and a panel driver. The display panel includes a first pixel including a (1-1)-th type light emitting and a (2-1)-th type light emitting element, and a second pixel including a (1-2)-th type light emitting element and a (2-2)-th type light emitting element, and a third pixel including a (1-3)-th type light emitting element and a (2-3)-th type light emitting element. When the (1-1)-th type light emitting element operates, and the (2-2)-th type light emitting element operate, the panel driver may correct data so that the third pixel displays an intermediate luminance between a luminance of the first pixel and a luminance of the second pixel, and output corrected data to the third pixel.

17 Claims, 13 Drawing Sheets

(56) References Cited

U.S. PATENT DOCUMENTS

| | | | | |
|---|---|---|---|---|
| 11,508,312 | B2 * | 11/2022 | Kim | G09G 3/3233 |
| 11,854,470 | B2 | 12/2023 | Kim et al. | |
| 2011/0037784 | A1 * | 2/2011 | Shiomi | G09G 3/3426 345/102 |
| 2011/0037785 | A1 * | 2/2011 | Shiomi | G09G 3/3426 345/102 |
| 2011/0063269 | A1 * | 3/2011 | Lee | G09G 3/3225 345/207 |
| 2012/0127064 | A1 * | 5/2012 | Kawano | G09G 3/3225 345/76 |
| 2021/0201723 | A1 * | 7/2021 | Choi | G09G 3/3233 |
| 2022/0115456 | A1 * | 4/2022 | Oh | H10K 59/121 |
| 2023/0177990 | A1 | 6/2023 | Kang et al. | |
| 2023/0206804 | A1 | 6/2023 | Park et al. | |
| 2024/0257719 | A1 * | 8/2024 | Shin | G09G 3/32 |
| 2024/0260429 | A1 * | 8/2024 | Go | H10K 59/122 |
| 2025/0218372 | A1 * | 7/2025 | Choi | G09G 3/3233 |
| 2025/0279026 | A1 * | 9/2025 | Kim | G09G 3/3233 |

FOREIGN PATENT DOCUMENTS

| | | | |
|---|---|---|---|
| KR | 10-2022-0093630 | A | 7/2022 |
| KR | 10-2023-0096546 | A | 6/2023 |

* cited by examiner

40

| N = 12 | | |
|---|---|---|
| PV | GS | ID |
| 0 | 0 | 0 |
| 1 | 1 | 3 |
| 2 | 1 | 3 |
| 3 | 1 | 3 |
| 4 | 2 | 3 |
| 5 | 2 | 3 |
| 6 | 2 | 3 |
| 7 | 3 | 3 |
| 8 | 3 | 3 |
| 9 | 3 | 3 |
| ≥10 | 0 | 0 |

ELECTRONIC DEVICE

CROSS-REFERENCE TO RELATED APPLICATIONS

This U.S. non-provisional patent application claims priority under 35 U.S.C. § 119 of Korean Patent Application No. 10-2024-0053078, filed on Apr. 22, 2024, the entire contents of which are hereby incorporated by reference.

BACKGROUND

The present disclosure relates to an electronic device including pixels driven in different modes from each other.

Electronic devices used in various apparatuses such as televisions, mobile phones, tablet computers, and vehicles, are developed. As restrictions on viewing angles of the electronic devices are required in accordance with regulations for safety or use environments in which information needs to be protected, different images may be provided to divided display areas of one display panel, respectively.

SUMMARY

The present disclosure herein provides an electronic device including pixels operated in different modes from each other.

An embodiment of an electronic device includes a display panel in which a first area, a second area, and a border area between the first area and the second area are defined, and a panel driver which drives the display panel. The display panel may include a first pixel, which is disposed in the first area and includes a first pixel circuit, a (1-1)-th type light emitting element electrically connected to the first pixel circuit, and a (2-1)-th type light emitting element electrically connected to the first pixel circuit, and a second pixel, which is disposed in the second area and includes a second pixel circuit, a (1-2)-th type light emitting element electrically connected to the second pixel circuit, and a (2-2)-th type light emitting element electrically connected to the second pixel circuit, and a third pixel which is disposed in the border area and includes a third pixel circuit, a (1-3)-th type light emitting element electrically connected to the third pixel circuit, and a (2-3)-th type light emitting element electrically connected to the third pixel circuit. When the (1-1)-th type light emitting element of the first area operates, and the (2-2)-th type light emitting element of the second area operates, the panel driver may correct data so that the third pixel displays an intermediate luminance between a luminance of the first pixel and a luminance of the second pixel, and output corrected data to the third pixel.

In an embodiment, each of the first area, the second area, and the border area may be selectively driven in a first mode or a second mode. In the first mode, the (1-1)-th type light emitting element, the (1-2)-th type light emitting element, and the (1-3)-th type light emitting element may operate, and the (2-1)-th type light emitting element, the (2-2)-th type light emitting element, and the (2-3)-th type light emitting element may not operate. In the second mode, the (1-1)-th type light emitting element, the (1-2)-th type light emitting element, and the (1-3)-th type light emitting element may not operate, and the (2-1)-th type light emitting element, the (2-2)-th type light emitting element, and the (2-3)-th type light emitting element may operate.

In an embodiment, the border area may include a first border area and a second border area, the third pixel may be provided in plurality, and the plurality of third pixels may include a plurality of (3-1)-th pixels disposed in the first border area, and a plurality of (3-2)-th pixels disposed in the second border area.

In an embodiment, the first area and the first border area may be driven in a first mode, and the second area and the second border area may be driven in a second mode.

In an embodiment, when the first border area is driven in the first mode, the (1-3)-th type light emitting element of each of the plurality of (3-1)-th pixels may operate, and when the second border area is driven in the second mode, the (2-3)-th type light emitting element of each of the plurality of (3-2)-th pixels may operate.

In an embodiment, the panel driver may correct data so that the plurality of (3-1)-th pixels display the intermediate luminance between the luminance of the first pixel and the luminance of the second pixel, and output the corrected data to the plurality of (3-1)-th pixels.

In an embodiment, the panel driver may correct data so that the plurality of (3-2)-th pixels display the intermediate luminance between the luminance of the first pixel and the luminance of the second pixel, and output the corrected data to the plurality of (3-2)-th pixels.

In an embodiment, the panel driver may include a deciding part which designates the border area, a calculating part which calculates a first average luminance of the plurality of (3-1)-th pixels of the first border area and a second average luminance of the plurality of (3-2)-th pixels of the second border area and computes a difference value between the first average luminance and the second average luminance, and a correction data generating part which determines the intermediate luminance based on the difference value and generate the corrected data.

In an embodiment, the panel driver may further include a correction determining part which determines whether or not to generate the corrected data based on the first average luminance and the second average luminance.

In an embodiment, the panel driver may further include a memory which stores a correction value corresponding to the difference value between the first average luminance and the second average luminance.

In an embodiment, the memory may further include an ID value including information about a delay value corresponding to the difference value between the first average luminance and the second average luminance.

In an embodiment, a surface area of a first light emitting area defined in the (1-1)-th type light emitting element may be greater than a surface area of a second light emitting area defined in the (2-1)-th type light emitting element.

An embodiment of an electronic device includes a display panel in which a first area, a second area, and a border area between the first area and the second area are defined, and a panel driver which drives the display panel. The display panel may include a plurality of horizontal lines, each of the plurality of horizontal lines includes a first pixel disposed in the first area, a second pixel disposed in the second area, and a plurality of third pixels disposed in the border area, and the first pixel, the plurality of third pixels, and the second pixel may be arranged in sequence along each of the plurality of horizontal lines. The panel driver may correct data for each of the plurality of horizontal lines so that, in each of the plurality of horizontal lines, the plurality of third pixels display an intermediate luminance between a luminance of the first pixel driven in a first mode and a luminance of the second pixel driven in a second mode different from the first mode, and output a corrected data to the plurality of third pixels. When data correction for one of the plurality of horizontal lines is completed, the panel driver may enter a data correction mode for a next horizontal line.

In an embodiment, the first pixel may include a (1-1)-th type light emitting element and a (2-1)-th type light emitting element, the second pixel may include a (1-2)-th type light emitting element and a (2-2)-th type light emitting element, and the plurality of third pixels may include a (1-3)-th type light emitting element and a (2-3)-th type light emitting element. Each of the first area, the second area, and the border area may be selectively driven in a first mode or a second mode. In the first mode, the (1-1)-th type light emitting element, the (1-2)-th type light emitting element, and the (1-3)-th type light emitting element may operate, and the (2-1)-th type light emitting element, the (2-2)-th type light emitting element, and the (2-3)-th type light emitting element may not operate. In the second mode, the (1-1)-th type light emitting element, the (1-2)-th type light emitting element, and the (1-3)-th type light emitting element may not operate, and the (2-1)-th type light emitting element, the (2-2)-th type light emitting element, and the (2-3)-th type light emitting element may operate.

In an embodiment, the border area may include a first border area and a second border area, and the plurality of third pixels may include a plurality of (3-1)-th pixels disposed in the first border area, and a plurality of (3-2)-th pixels disposed in the second border area. Each of the plurality of (3-1)-th pixels may include a (3-1)-th pixel circuit, and a (1-3a)-th type light emitting and a (2-3a)-th type light emitting element each electrically connected to the (3-1)-th pixel circuit, and the plurality of (3-2)-th pixels may include a (3-2)-th pixel circuit, and a (1-3b)-th type light emitting element and a (2-3b)-th type light emitting element each electrically connected to the (3-2)-th pixel circuit.

In an embodiment, the first area and the first border area may be driven in the first mode, and the second area and the second border area may be driven in the second mode. When the first border area is driven in the first mode, the (1-3a)-th type light emitting element of each of the plurality of (3-1)-th pixels may operate, and when the second border area is driven in the second mode, the (2-3b)-th type light emitting element of each of the plurality of (3-2)-th pixels may operate.

In an embodiment, the panel driver may correct data for each of the plurality of horizontal lines so that the plurality of (3-1)-th pixels display the intermediate luminance between the luminance of the first pixel and the luminance of the second pixel, and output the corrected data to the plurality of (3-1)-th pixels.

In an embodiment, the panel driver may correct data for each of the plurality of horizontal lines so that the plurality of (3-2)-th pixels display the intermediate luminance between the luminance of the first pixel and the luminance of the second pixel, and output the corrected data to the plurality of (3-2)-th pixels.

In an embodiment, the panel driver may include a deciding part which designates the border area, a calculating part which calculates a first average luminance of the plurality of (3-1)-th pixels and a second average luminance of the plurality of (3-2)-th pixels and computes a difference value between the first average luminance and the second average luminance, and a correction data generating part which determines the intermediate luminance based on the difference value and generate the corrected data.

In an embodiment, the panel driver may further include a correction determining part which determines whether or not to generate the corrected data based on the first average luminance and the second average luminance, and a memory which stores a correction value corresponding to the difference value between the first average luminance and the second average luminance. The memory may further include an ID value including information about a delay value corresponding to the difference value between the first average luminance and the second average luminance.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
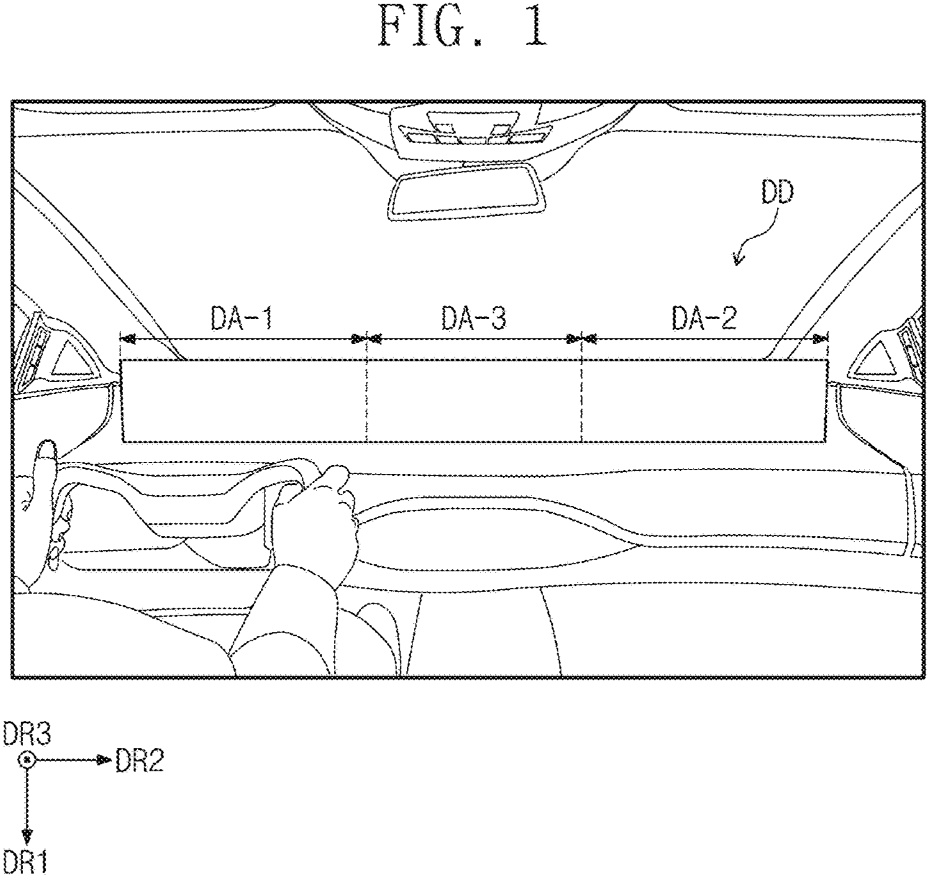
FIG. 1 illustrates an interior of a vehicle including an electronic device according to an embodiment of the inventive concept.

In this specification, it will be understood that when an element (or region, layer, section, etc.) is referred to as being "on", "connected to" or "coupled to" another element, it can be disposed directly on, connected or coupled to the other element or a third element may be disposed between the elements.

Like reference numbers or symbols refer to like elements throughout. In addition, in the drawings, the thickness, the ratio, and the dimension of elements are exaggerated for effective description of the technical contents. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concept and are explained based on the direction shown in the drawing.

It will be further understood that the terms such as "comprise", "include", and "have" (as well as their variations such as "comprising"), when used herein, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "part" or "unit" means a software component or a hardware component for performing a specific function. The hardware component may include, for example, a field-programmable gate array (FPGA) or an application-specific integrated circuit (ASIC). The software component may refer to executable code or data used by executable code in an addressable storage medium. The software components may be, for example, object-oriented software components, class components and task components, and may include processes, functions, attributes, procedures, subroutines, segments of program code, drivers, firmware, microcode, circuitry, data, databases, data structures, tables, arrays, or variables.

Hereinafter, embodiments of the inventive concept will be described with reference to the accompanying drawings.

Figure 2:
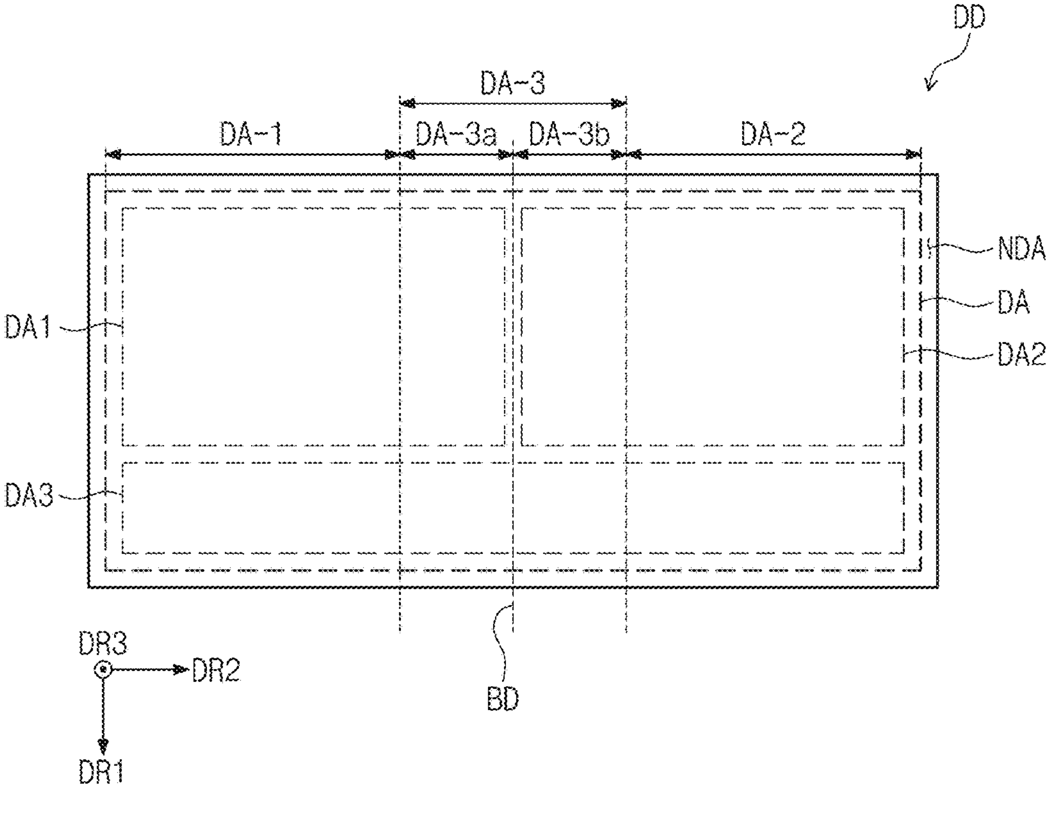
FIG. 2 is a plan view of an in-vehicle electronic device according to an embodiment of the inventive concept.

FIG. 1 is illustrates an interior of a vehicle in which an electronic device DD is disposed according to an embodiment of the inventive concept. FIG. 2 is a plan view of an in-vehicle electronic device according to an embodiment of the inventive concept.

Referring to FIGS. 1 and 2, an electronic device DD may be disposed in the interior of the vehicle. The electronic device DD may be disposed in the interior of the vehicle to provide various information for a driver and a passenger on a front passenger seat.

In an embodiment of the inventive concept, the electronic device DD may be one electronic device including one panel. Thus, the electronic device DD may include one display panel DP in which a display area DA and a non-display area NDA are defined. The display area DA may include a first area DA-1, a second area DA-2, and a border area DA-3 according to the field of view of the driver and the passenger on the front passenger seat. The first area DA-1, the second area DA-2, and the border area DA-3 may be referred to as divided display areas.

The first area DA-1 may be an area disposed close to the driver, and the second area DA-2 may be an area disposed close to the passenger on the front passenger seat. The border area DA-3 may be disposed between the first area DA-1 and the second area DA-2. The border area DA-3 may include a first border area DA-3*a* and a second border area DA-3*b*. In the border area DA-3, an area disposed close to the first area DA-1 may be defined as the first border area DA-3*a*, and an area disposed close to the second area DA-2 may be defined as the second border area DA-3*b*.

Images including information necessary for the driver and the passenger on the front passenger seat, respectively, may be separated and displayed on the display area DA. For example, the display area DA may include a first display area DA1, a second display area DA2, and a third display area DA3. The first display area DA1 may include a portion of the first area DA-1 and a portion of the first border area DA-3*a*, and the second display area DA2 may include a portion of the second area DA-2 and a portion of the second border area DA-3*b*. Thus, the first display area DA1 and the second display area DA2 may be disposed at both sides with a boundary BD therebetween. The third display area DA3 may include a portion of the first area DA-1, a portion of the second area DA-2, and a portion of the border area DA-3. The third display area DA3 may be disposed on respective lower ends of the first display area DA1 and the second display area DA2.

In an embodiment of the inventive concept, the first display area DA1 may display an image required for driving to the driver at the wheel. For example, driving speed information, vehicle condition information, vehicle internal operation information, navigation information, and the like, which are required for driving, may be displayed. The second display area DA2 may display an image necessary for the passenger on the front passenger seat. For example, not only the information required for driving but also various information including an image irrelevant to driving may be displayed. In a non-driving environment, the driver and the passenger on the front passenger seat may watch all of the images displayed on the first display area DA1 and the second display area DA2. In a driving environment, the passenger on the front passenger seat may watch all of the images displayed on the first display area DA1 and the second display area DA2 like in the non-driving environment, but the driver may be in a viewing-angle control environment in which the driver is prevented from watching the image displayed on the second display area DA2.

The third display area DA3 may display an image provided, in common, for the driver and the passenger on the front passenger seat. For example, a current outside temperature, an in-vehicle temperature, sound volume information, and the like may be displayed. Thus, the driver and the passenger on the front passenger seat may watch the image displayed on the third display area DA3 not only in the non-driving environment but also in the driving environment.

The image displayed on the third display area DA3 may be a continued image overlapping the boundary BD. According to an embodiment of the inventive concept, data may be corrected so that a luminance difference occurring near the boundary BD is prevented from being visible to a user. Thus, the electronic device DD with improved display quality may be provided.

Figure 3:
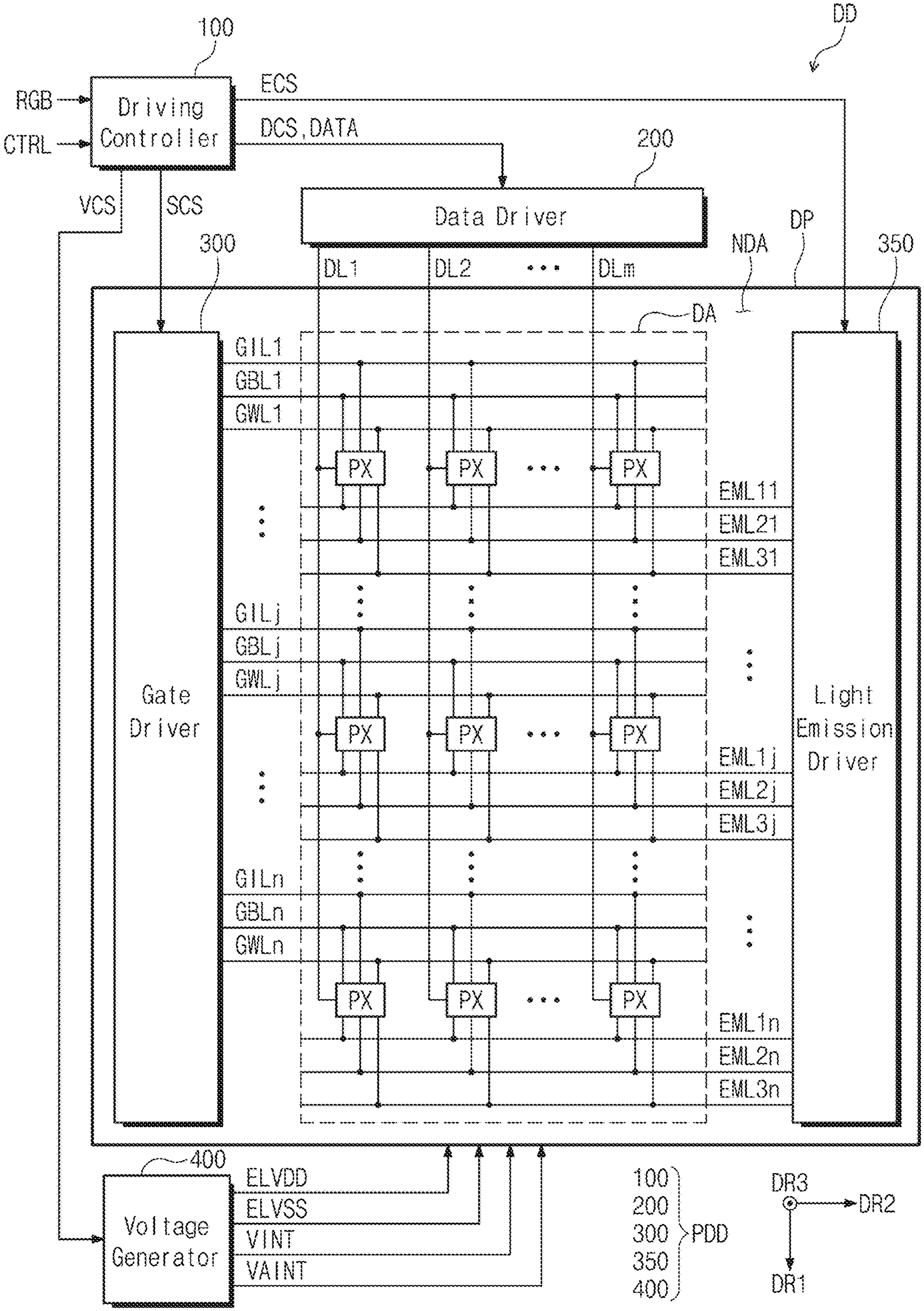
FIG. 3 is a block diagram of an electronic device according to an embodiment of the inventive concept.

FIG. 3 is a block diagram of an electronic device DD according to an embodiment of the inventive concept.

Referring to FIG. 3, the electronic device DD may further include a panel driver PDD for driving a display panel DP. As one example of an embodiment of the inventive concept, the panel driver PDD may include a driving controller 100, a data driver 200, a gate driver 300, a light emission driver 350, and a voltage generator 400.

The display panel DP may include a plurality of pixels PX disposed on a display area DA. Each of the plurality of pixels PX includes at least one light emitting elements ED1 and ED2 (see FIG. 4), and a pixel circuit PXC (see FIG. 4) that controls light emission of the light emitting elements ED1 and ED2. The pixel circuit PXC may include at least one transistor and at least one capacitor.

The display panel DP may further include initialization gate lines GIL1 to GILn, write gate lines GWL1 to GWLn, black gate lines GBL1 to GBLn, first light-emission control lines EML11 to EMLIn, second light-emission control lines EML21 to EML2*n*, third light-emission control lines EML31 to EML3*n*, and data lines DL1 to DLm.

The driving controller 100 receives an image signal RGB and a control signal CTRL. The driving controller 100 generates an image data signal DATA obtained by converting a data format of the image signal RGB to match an interface specification of the data driver 200. The driving controller 100 may output a first control signal SCS, a second control signal ECS, a third control signal DCS, and a fourth control signal VCS.

The data driver 200 receives the third control signal DCS and the image data signal DATA from the driving controller 100. The data driver 200 converts the image data signal DATA to data signals, and outputs the data signals to the data lines DL1 to DLm. The data signals are analog voltages corresponding to a grayscale value of the image data signal DATA. The data lines DL1 to DLm may be arranged in a second direction DR2, and each of the data lines DL1 to DLm may extend in a first direction DR1.

The gate driver 300 and the light emission driver 350 may be disposed on a non-display area NDA of the display panel DP, but are not particularly limited thereto. For example, at least a portion of the gate driver 300 or a portion of the light emission driver 350 may be disposed on the display area DA. The gate driver 300 and the light emission driver 350 may include transistors formed through the same process as the pixel circuit PXC (see FIG. 4).

The gate driver 300 may be electrically connected to each of the initialization gate lines GIL1 to GILn, the write gate lines GWL1 to GWLn, and the black gate lines GBL1 to GBLn. Thus, the gate driver 300 may receive the first control signal SCS, and output gate signals to the initialization gate lines GIL1 to GILn, the write gate lines GWL1 to GWLn, and the black gate lines GBL1 to GBLn.

The light emission driver 350 may be electrically connected to each of the first light-emission control lines EML11 to EMLIn, the second light-emission control lines EML21 to EML2*n*, and the third light-emission control lines EML31 to EML3*n*. Thus, the light emission driver 350 may receive the second control signal ECS, and output light-emission control signals to the first light-emission control lines EML11 to EMLIn, the second light-emission control lines EML21 to EML2*n*, and the third light-emission control lines EML31 to EML3*n*.

The gate driver 300 and the light emission driver 350 may be spaced apart from each other with the display area DA therebetween. However, this is just given as one example, and the gate driver 300 and the light emission driver 350 may be disposed at the same one side of the display area DA. Alternatively, at least a portion of the gate driver 300 and the light emission driver 350 may overlap the display area DA.

Each of the initialization gate lines GIL1 to GILn, the write gate lines GWL1 to GWLn, the black gate lines GBL1 to GBLn, the first light-emission control lines EML11 to EMLIn, the second light-emission control lines EML21 to EML2*n*, and the third light-emission control lines EML31 to EML3*n* may extend in the second direction DR2.

Figure 4:
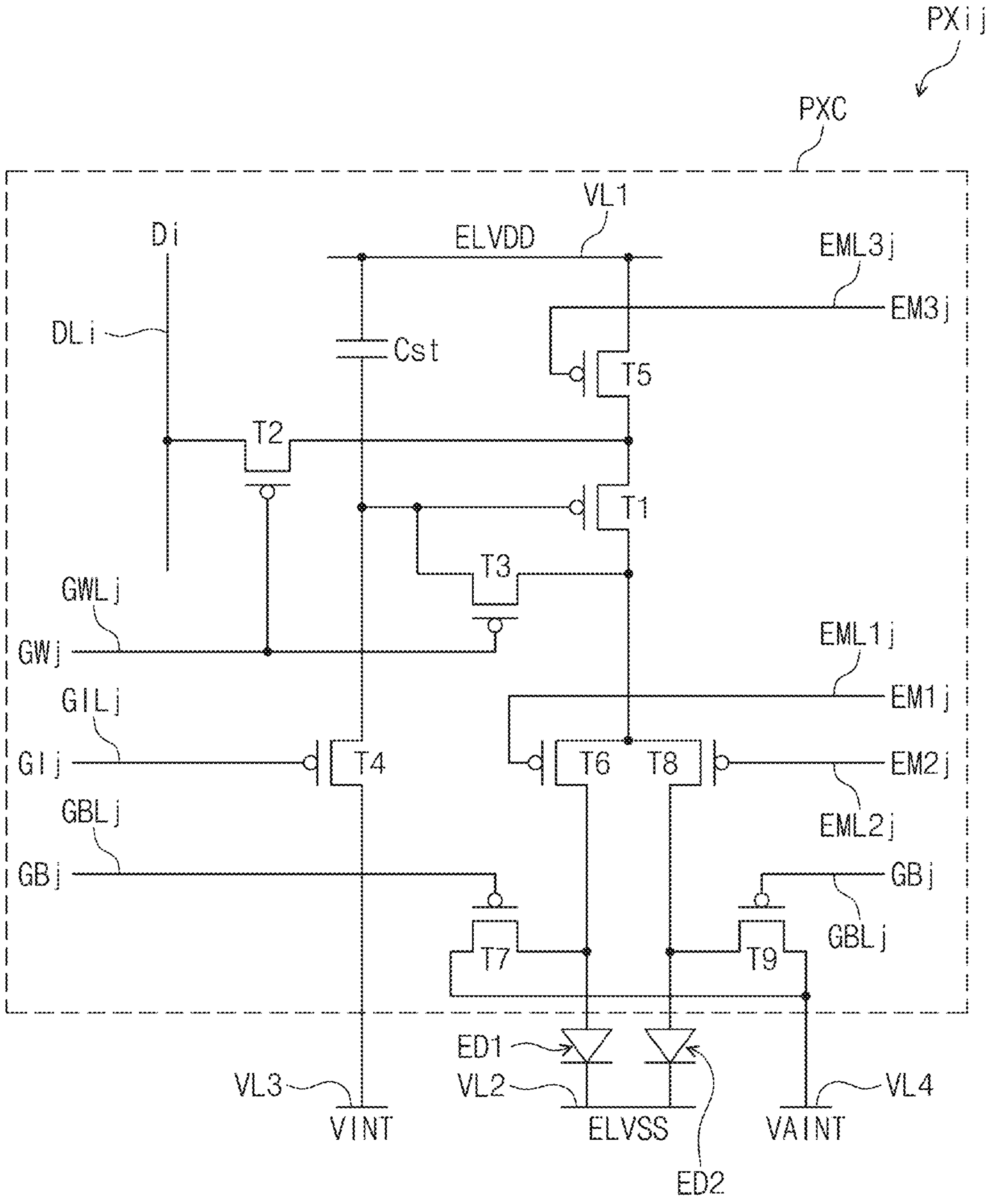
FIG. 4 is a circuit diagram of a pixel according to an embodiment of the inventive concept.

Each of the plurality of pixels PX may be electrically connected to three gate lines, three light-emission control lines, and one data line. For example, as illustrated in FIG. 4, each of pixels in a first row may be connected to the gate lines GIL1, GWL1 and GBL1 and the light-emission control lines EML11, EML21 and EML31. The pixels in the first row may be connected to the data line DL1. In addition, each of pixels in a j-th row may be connected to the gate lines GILj, GWLj and GBLj and the light-emission control lines EML1*j*, EML2*j* and EML3*j*.

The voltage generator 400 generates voltages required for an operation of the display panel DP. In this embodiment, the voltage generator 400 may generate a first driving voltage ELVDD, a second driving voltage ELVSS, a first initialization voltage VINT, and a second initialization voltage VAINT.

FIG. 4 is a circuit diagram of a pixel PXij according to an embodiment of the inventive concept.

Referring to FIGS. 3 and 4, the pixel PXij may be connected to a j-th initialization gate line GILj, a j-th black gate line GBLj, a j-th write gate line GWLj, a j-th first light-emission control line EML1*j*, a j-th second light-emission control line EML2*j*, a j-th third light-emission control line EML3*j*, and an i-th data line DLi. Each of the plurality of pixels PX illustrated in FIG. 3 may have the same circuit configuration as the pixel PXij illustrated in FIG. 4.

The pixel PXij according to an embodiment of the inventive concept may include a pixel circuit PXC, a first-type light emitting element ED1, and a second-type light emitting element ED2. The pixel circuit PXC may include first to ninth transistors T1, T2, T3, T4, T5, T6, T7, T8 and T9, and a capacitor Cst.

Each of the first to ninth transistors T1, T2, T3, T4, T5, T6, T7, T8 and T9 may be a p-type thin film transistor having a silicon semiconductor layer, for example, a low-temperature polycrystalline silicon (LTPS) semiconductor layer. However, an embodiment of the inventive concept is not limited. For example, some of the first to ninth transistors T1, T2, T3, T4, T5, T6, T7, T8 and T9 may be n-type thin film transistors each having an oxide semiconductor for a semiconductor layer, and the others may be p-type thin film transistors. In another embodiment, all of the first to ninth transistors T1, T2, T3, T4, T5, T6, T7, T8 and T9 may be n-type thin film transistors.

The j-th initialization gate line GILj may transmit an initialization gate signal GIj, the j-th black gate line GBLj may transmit a black gate signal GBj, the j-th write gate line GWLj may transmit a write gate signal GWj, the j-th first light-emission control line EML1*j* may transmit a first light-emission control signal EM1*j*, the j-th second light-emission control line EML2*j* may transmit a second light-emission control signal EM2*j*, the j-th third light-emission control line EML3*j* may transmit a third light-emission control signal EM3*j*, and the i-th data line DLi may transmit a data signal Di. The data signal Di may have a voltage level corresponding to a grayscale value of an image data signal DATA output from a driving controller 100.

In addition, the pixel PXij may be connected to first to fourth driving voltage lines VL1, VL2, VL3 and VL4. The first driving voltage line VL1 may transmit a first driving voltage ELVDD. The second driving voltage line VL2 may transmit a second driving voltage ELVSS. The third driving voltage line VL3 may transmit a first initialization voltage VINT and be referred to as a first initialization voltage line. The fourth driving voltage line VL4 may transmit a second initialization voltage VAINT and be referred to as a second initialization voltage line.

The first transistor T1 includes a first electrode electrically connected to the first driving voltage line VL1 via the fifth transistor T5, a second electrode, which is electrically connected to an anode of the first-type light emitting element ED1 via the sixth transistor T6 or is electrically connected to an anode of the second-type light emitting element ED2 via the eighth transistor T8, and a gate electrode. The first transistor T1 may be referred to as a driving transistor.

The second transistor T2 may be connected between the first electrode of the first transistor T1 and the i-th data line DLi. The second transistor T2 includes a first electrode connected to the i-th data line DLi, a second electrode connected to the first electrode of the first transistor T1, and a gate electrode connected to the j-th write gate line GWLj. The second transistor T2 may be turned on in response to the write gate signal GWj received through the j-th write gate line GWLj, and transmit the data signal Di received from the i-th data line DLi to the first transistor T1. The second transistor T2 may be referred to as a switching transistor.

The capacitor Cst may be connected between the gate electrode of the first transistor T1 and the first driving voltage line VL1.

The third transistor T3 includes a first electrode connected to the second electrode of the first transistor T1, a second electrode connected to the gate electrode of the first transistor T1, and a gate electrode connected to the j-th write gate line GWLj. The third transistor T3 may be turned on in response to the write gate signal GWj, and connect the gate electrode of the first transistor T1 and the second electrode of the first transistor T1 to each other.

The fourth transistor T4 includes a first electrode connected to the gate electrode of the first transistor T1, a second electrode connected to the third driving voltage line VL3, and a gate electrode connected to the j-th initialization gate line GILj. The fourth transistor T4 may be turned on in response to the initialization gate signal GIj received through the j-th initialization gate line GILj, and transmit the first initialization voltage VINT to the gate electrode of the first transistor T1, thereby initializing a voltage of the gate electrode of the first transistor T1.

The fifth transistor T5 may be connected between the first electrode of the first transistor T1 and the first driving voltage line VL1. The fifth transistor T5 includes a first electrode connected to the first driving voltage line VL1, a second electrode connected to the first electrode of the first transistor T1, and a gate electrode connected to the j-th third light-emission control line EML3*j*. The fifth transistor T5 may be turned on in response to the third light-emission control signal EM3*j* received through the j-th third light-emission control line EML3*j*. The fifth transistor T5 may be referred to as a third light-emission control transistor.

The sixth transistor T6 may be connected between the second electrode of the first transistor T1 and the first-type light emitting element ED1. The sixth transistor T6 includes a first electrode connected to the second electrode of the first transistor T1, a second electrode connected to the anode of the first-type light emitting element ED1, and a gate electrode connected to the j-th first light-emission control line EML1*j*. The sixth transistor T6 may be turned on in response to the first light-emission control signal EM1*j* received through the j-th first light-emission control line EML1*j*. The sixth transistor T6 may be referred to as a first light-emission control transistor.

The seventh transistor T7 may be connected between a first node N1 between the sixth transistor T6 and the first-type light emitting element ED1, and the fourth driving voltage line VL4. The seventh transistor T7 includes a first electrode connected to the anode of the first-type light emitting element ED1, a second electrode connected to the fourth driving voltage line VL4, and a gate electrode connected to the j-th black gate line GBLj. The seventh transistor T7 may be turned on in response to the black gate signal GBj received through the j-th black gate line GBLj, and connect the fourth driving voltage line VL4, through which the second initialization voltage VAINT is provided, and the first-type light emitting element ED1 to each other. The black gate signal GBj may be referred to as the initialization gate signal GIj, and the seventh transistor T7 may be referred to as a first initialization transistor.

The eighth transistor T8 may be connected between the second electrode of the first transistor T1 and the second-type light emitting element ED2. The eighth transistor T8 includes a first electrode connected to the second electrode of the first transistor T1, a second electrode connected to the anode of the second-type light emitting element ED2, and a gate electrode connected to the j-th second light-emission control line EML2*j*. The eighth transistor T8 may be turned on in response to the second light-emission control signal EM2*j* received through the j-th second light-emission control line EML2*j*. The eighth transistor T8 may be referred to as a second light-emission control transistor.

The ninth transistor T9 may be connected between a second node N2 between the eighth transistor T8 and the second-type light emitting element ED2, and the fourth driving voltage line VL4. The ninth transistor T9 includes a first electrode connected to the anode of the second-type light emitting element ED2, a second electrode connected to the fourth driving voltage line VL4, and a gate electrode connected to the j-th black gate line GBLj. The ninth transistor T9 may be turned on in response to the black gate signal GBj received through the j-th black gate line GBLj, and connect the fourth driving voltage line VL4, through which the second initialization voltage VAINT is provided, and the second-type light emitting element ED2 to each other. The black gate signal GBj may be referred to as the initialization gate signal GBj, and the ninth transistor T9 may be referred to as a second initialization transistor.

In an embodiment of the inventive concept, as the fifth transistor T5 and the sixth transistor T6 are turned on, a current path may be provided between the first driving voltage line VL1 and the first-type light emitting element ED1 through the fifth transistor T5, the first transistor T1, and the sixth transistor T6. Alternatively, as the fifth transistor T5 and the eighth transistor T8 are turned on, a current path may be provided between the first driving voltage line VL1 and the second-type light emitting element ED2 through the fifth transistor T5, the first transistor T1, and the eighth transistor T8.

The first-type light emitting element ED1 and the second-type light emitting element ED2, which are controlled by being connected to the one pixel circuit PXC, may emit light having substantially the same color. A cathode of the first-type light emitting element ED1 and a cathode of the second-type light emitting element ED2 may be electrically connected to the second driving voltage line VL2 to which the second driving voltage ELVSS different from the first driving voltage ELVDD is applied.

The first-type light emitting element ED1 and the second-type light emitting element ED2 may each selectively emit light according to a driving environment or a non-driving environment. For example, in the driving environment, the first-type light emitting element ED1 may be turned off, and the second-type light emitting element ED2 may be turned on. Unlike the first-type light emitting element ED1, the second-type light emitting element ED2 may have an upper portion on which a plurality of light control layers are disposed. Thus, in the driving environment in which the second-type light emitting element ED2 emits light, the light emitted from the second-type light emitting element ED2 may be in a viewing-angle control environment in which a path of the light is restricted by the light control layers disposed on the upper portion of the second-type light emitting element ED2.

In an embodiment of the inventive concept, each of the first-type light emitting element ED1 and the second-type light emitting element ED2 may be selectively driven in a first mode or a second mode. Here, the first mode may be defined as a public mode, and the second mode may be defined as a private mode. The private mode may be a viewing-angle control environment mode. In the non-driving environment, the first-type light emitting element ED1 may be turned on to operate in the first mode that is the public mode. Here, the second-type light emitting element ED2 may be turned off. However, an embodiment of the inventive concept is not limited thereto, and the second-type light emitting element ED2 may be turned on. In the driving environment, an operation may be performed in the second mode that is a private mode in which the first-type light emitting element ED1 is turned off, and the second-type light emitting element ED2 is turned on.

Referring to FIG. 4, in the non-driving environment, the first-type light emitting element ED1 may emit the light as the sixth transistor T6 is turned on by the j-th first light-emission control line EML1*j*. In the driving environment, the second-type light emitting element ED2 may emit the light as the eighth transistor T8 is turned on by the j-th second light-emission control line EML2*j*.

Figure 5A:
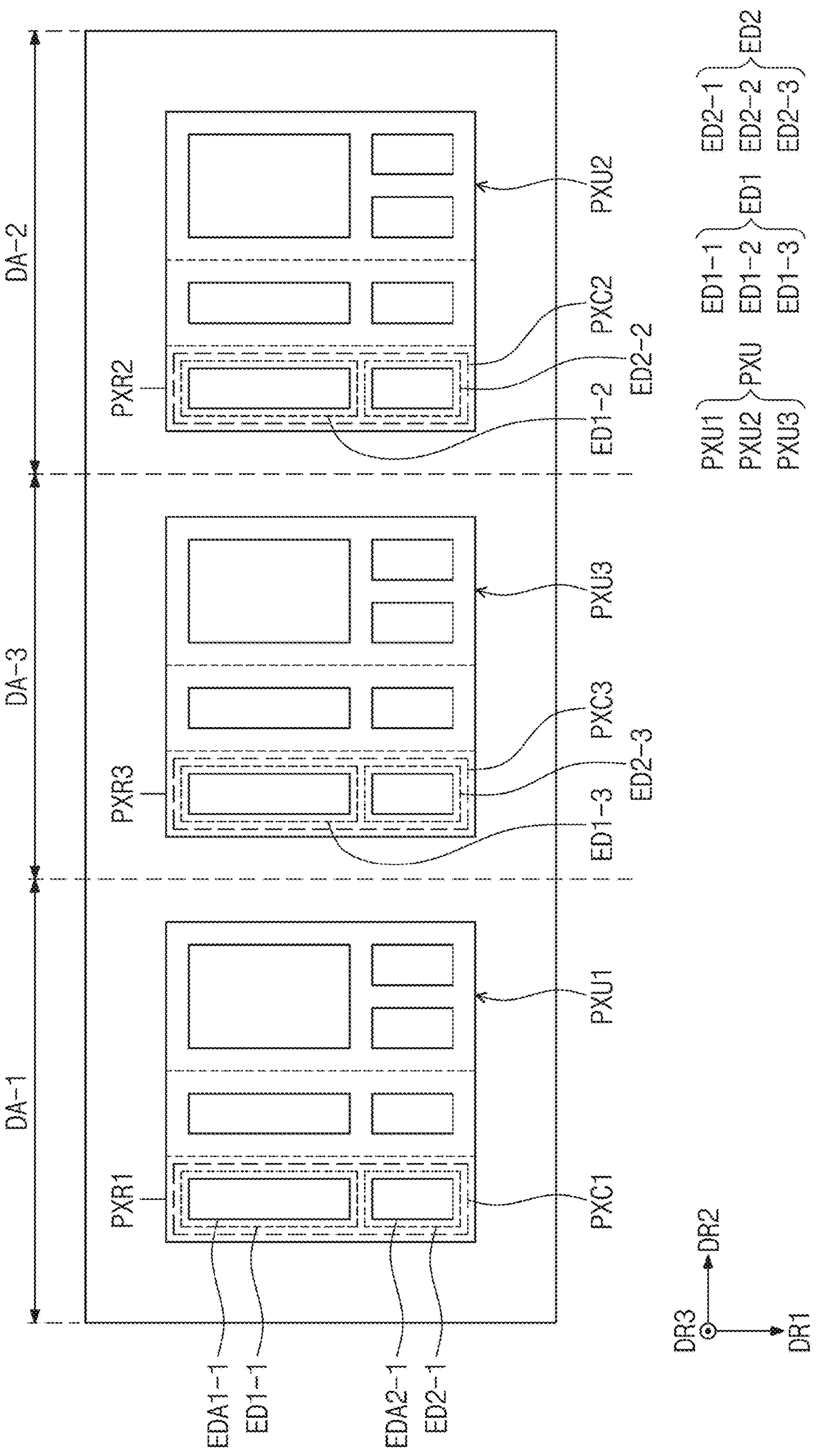
FIG. 5A is an enlarged plan view illustrating some pixel units of an electronic device according to an embodiment of the inventive concept.

FIG. 5A is an enlarged plan view illustrating some of pixel units PXU of an electronic device DD according to an embodiment of the inventive concept.

Referring to FIGS. 3 and 5A, a display panel DP may include a plurality of pixel units PXU. The plurality of pixel units PXU may be repeatedly arranged in the first direction DR1 and the second direction crossing the first direction DR1. FIG. 5A illustrates three pixel units PXU1, PXU2 and PXU3 as an example.

Each of the plurality of pixel units PXU may include a plurality of pixels PX. For example, the plurality of pixels PX may include a red pixel, a green pixel, and a blue pixel. Although FIG. 5A is descriptive of an example in which each of the pixel units PXU1, PXU2 and PXU3 includes three pixels, each of the pixel units PXU1, PXU2 and PXU3 may include four or more pixels, or alternatively may include two pixels. The red pixel includes a first pixel PXR1, a second pixel PXR2, and a third pixel PXR3. Hereinafter, the red pixel disposed in each area will be described as an example, and the green pixel and the blue pixel will not be described.

As illustrated as an example in FIG. 5A, the first pixel unit PXU1 may be disposed in a first area DA-1, the second pixel unit PXU2 may be disposed in a second area DA-2, and the third pixel unit PXU3 may be disposed in a border area DA-3.

The first pixel unit PXU1 may include the first pixel PXR1 including a first pixel circuit PXC1, a (1-1)-th type light emitting element ED1-1 electrically connected to the first pixel circuit PXC1, and a (2-1)-th type light emitting element ED2-1 electrically connected to the first pixel circuit PXC1.

The second pixel unit PXU2 may include the second pixel PXR2 including a second pixel circuit PXC2, a (1-2)-th type light emitting element ED1-2 electrically connected to the second pixel circuit PXC2, and a (2-2)-th type light emitting element ED2-2 electrically connected to the second pixel circuit PXC2.

The third pixel unit PXU3 may include the third pixel PXR3 including a third pixel circuit PXC3, a (1-3)-th type light emitting element ED1-3 electrically connected to the third pixel circuit PXC3, and a (2-3)-th type light emitting element ED2-3 electrically connected to the third pixel circuit PXC3.

The plurality of pixel units PXU may include a plurality of light emitting elements ED1 and ED2. The plurality of light emitting elements ED1 and ED2 may include a first-type light emitting element ED1 and a second-type light emitting element ED2. The first-type light emitting element ED1 may include the (1-1)-th type light emitting element ED1-1, the (1-2)-th type light emitting element ED1-2, and the (1-3)-th type light emitting element ED1-3. The second-type light emitting element ED2 may include the (2-1)-th type light emitting element ED2-1, the (2-2)-th type light emitting element ED2-2, and the (2-3)-th type light emitting element ED2-3.

In an embodiment of the inventive concept, a surface area of a light emitting area defined in each of the first-type light emitting elements ED1 may be greater than a surface area of a light emitting area defined in each of the second-type light emitting elements ED2. For example, a surface area of a first light emitting area EDA1-1 defined in the (1-1)-th type light emitting element ED1-1 of the first pixel PXR1 may be greater than a surface area of a second light emitting area EDA2-1 defined in the (2-1)-th type light emitting element ED2-1. However, an embodiment of the inventive concept is not limited thereto, and the surface area of the light emitting area defined in each of the first-type light emitting elements ED1 may be the same as the surface area of the light emitting area defined in each of the second-type light emitting elements ED2.

In an embodiment of the inventive concept, all of colors of the light provided from the first-type light emitting elements ED1 and the second-type light emitting elements ED2 may be substantially the same. For example, all of the first-type light emitting elements ED1 and the second-type light emitting elements ED2 may emit red light. Thus, all of the first pixel PXR1, the second pixel PXR2, and the third pixel PXR3 may be red pixels.

FIG. 5A is descriptive of the red pixels as an example, and specific descriptions of the green pixel and the blue pixel which are included in each of the plurality of pixel units PXU is omitted. FIG. 5A illustrates an example in which a light emitting area of a second-type light emitting element of a blue pixel PXB is divided into two, but an embodiment of the inventive concept is not particularly limited thereto. For example, the light emitting areas of the second-type light emitting element of the blue pixel PXB may be provided as being connected as one.

Each of the first area DA-1, the second area DA-2, and the border area DA-3 of the display panel DP may be selectively driven in a first mode or a second mode. In the first mode, the first-type light emitting elements ED1 may operate, and the second-type light emitting elements ED2 may not operate. However, an embodiment of the inventive concept is not limited thereto, and in the first mode, both the first-type light emitting elements ED1 and the second-type light emitting elements ED2 may operate.

In the second mode, the first-type light emitting elements ED1 may not operate, and the second-type light emitting elements ED2 may operate. Here, the first mode may be defined as a public mode, and the second mode may be defined as a private mode. The private mode may be a viewing-angle control environment. For example, when the second area DA-2, which is an area at a side of a passenger on a front passenger seat, operates in the private mode that is the second mode, a driver may be at a viewing angle control in which the driver is prevented from watching an image displayed on the second area DA-2.

Figure 5B:
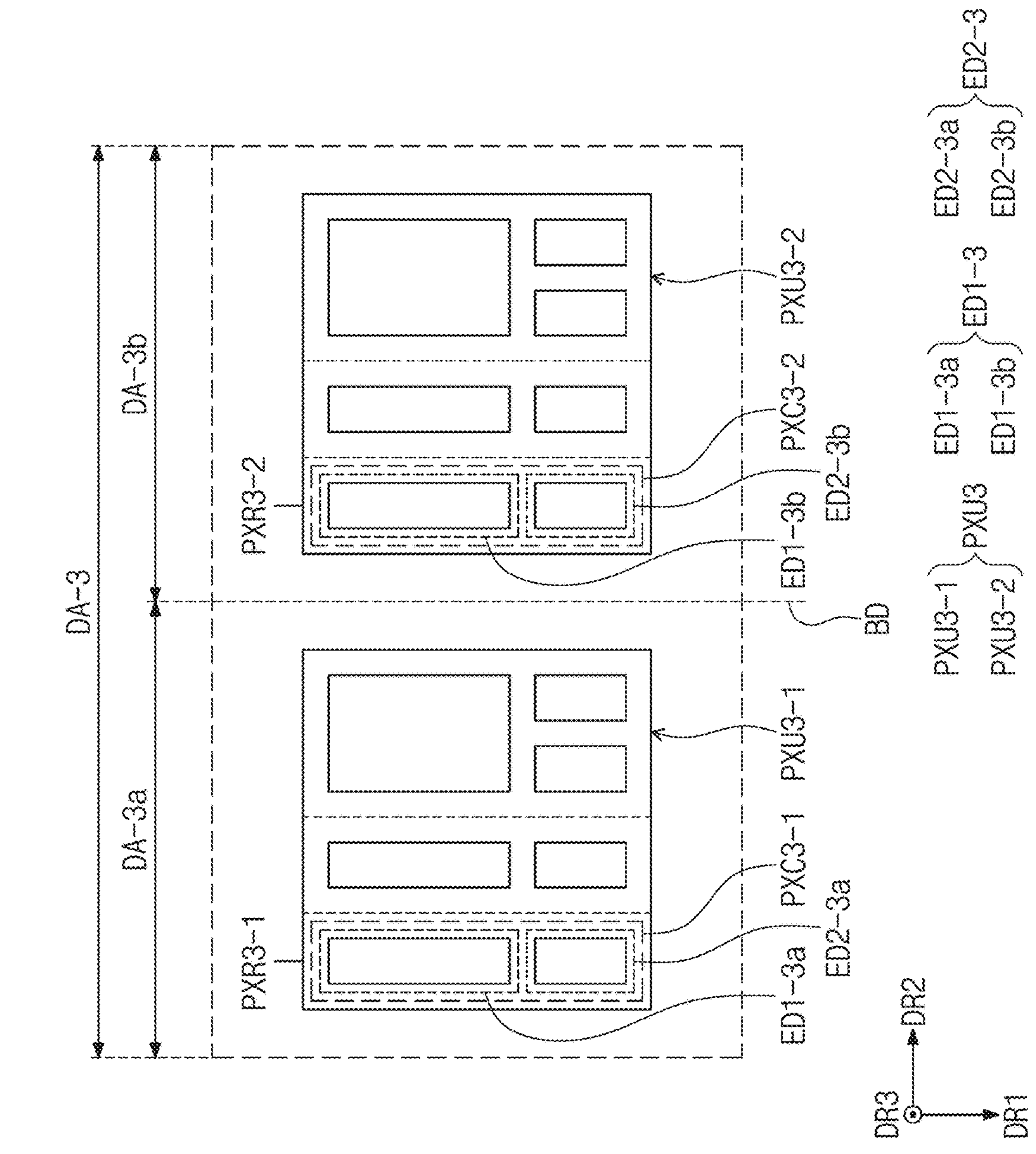
FIG. 5B is an enlarged plan view illustrating a plurality of pixel units in a border area according to an embodiment of the inventive concept.

FIG. 5B is an enlarged plan view illustrating a plurality of pixel units PXU3-1 and PXU3-2 in a border area DA-3 according to an embodiment of the inventive concept.

Referring to FIG. 5B, a (3-1)-th pixel unit PXU3-1 may be disposed in a first border area DA-3*a* of the border area DA-3, and a (3-2)-th pixel unit PXU3-2 may be disposed in a second border area DA-3*b* of the border area DA-3. In FIG. 5A, among the plurality of pixel units PXU, one third pixel unit PXU3 disposed in the border area DA-3 is described as an example, and in FIG. 5B, among the plurality of pixel units PXU, one (3-1)-th pixel unit PXU3-1 disposed in the first border area DA-3*a*, and one (3-2)-th pixel unit PXU3-2 disposed in the second border area DA-3*b* are described as an example.

In an embodiment of the inventive concept, the (3-1)-th pixel unit PXU3-1 may include a (3-1)-th pixel PXR3-1 including a (3-1)-th pixel circuit PXC3-1, a (1-3a)-th type light emitting element ED1-3*a* electrically connected to the (3-1)-th pixel circuit PXC3-1, and a (2-3a)-th type light emitting element ED2-3*a* electrically connected to the (3-1)-th pixel circuit PXC3-1.

The (3-2)-th pixel unit PXU3-2 may include a (3-2)-th pixel PXR3-2 including a (3-2)-th pixel circuit PXC3-2, a (1-3b)-th type light emitting element ED1-3*b* electrically connected to the (3-2)-th pixel circuit PXC3-2, and a (2-3b)-th type light emitting element ED2-3*b* electrically connected to the (3-2)-th pixel circuit PXC3-2.

Referring to FIGS. 5A and 5B, each of the first area DA-1, the second area DA-2, the first border area DA-3*a*, and the second border area DA-3*b* may be selectively driven in a first mode or a second mode. In an embodiment of the inventive concept, the first area DA-1 and the first border area DA-3*a* may be driven in the first mode, and the second area DA-2 and the second border area DA-3*b* may be driven in the second mode.

Thus, in a case in which the first area DA-1 and the first border area DA-3*a* are driven in the first mode, the (1-1)-th type light emitting element ED1-1 of the first pixel PXR1 disposed in the first area DA-1 may operate, but the (2-1)-th type light emitting element ED2-1 of the first pixel PXR1 may not operate, and the (1-3a)-th type light emitting element ED1-3*a* of the (3-1)-th pixel PXR3-1 disposed in the first border area DA-3*a* may operate, but the (2-3a)-th type light emitting element ED2-3*a* of the (3-1)-th pixel PXR3-1 may not operate. In a case in which the second area DA-2 and the second border area DA-3*b* are driven in the second mode, the (1-2)-th type light emitting element ED1-2 of the second pixel PXR2 disposed in the second area DA-2 may not operate, but the (2-2)-th type light emitting element ED2-2 of the second pixel PXR2 may operate, and the (1-3b)-th type light emitting element ED1-3*b* of the (3-2)-th pixel PXR3-2 disposed in the second border area DA-3*b* may not operate, but the (2-3b)-th type light emitting element ED2-3*b* of the (3-2)-th pixel PXR3-2 may operate.

In an embodiment of the inventive concept, a first gamma value may be applied to an image disposed on the first area DA-1 and the first border area DA-3*a*, and a second gamma value may be applied to an image disposed on the second area DA-2 and the second border area DA-3*b*. The first gamma value and the second gamma value may be different from each other. For example, the first gamma value may be less than the second gamma value. Thus, a luminance of each of the first area DA-1 and the first border area DA-3*a* may be higher than a luminance of each of the second area DA-2 and the second border area DA-3*b*. When a luminance difference occurs according to a difference between the first gamma value and the second gamma value, or a difference in size between the light emitting areas that emit light, a driver and a passenger on a front passenger seat may visually recognize a boundary BD of the border area DA-3. In an embodiment of the inventive concept, data may be corrected so that the boundary BD visible due to the luminance difference is prevented from being visible. Thus, the luminance difference of the continuous image may be minimized, and thus the luminance difference may not be visible to a user. As a result, the electronic device DD (see FIG. 1) with improved display quality may be provided. Hereinafter, data correction will be described.

Figure 6:
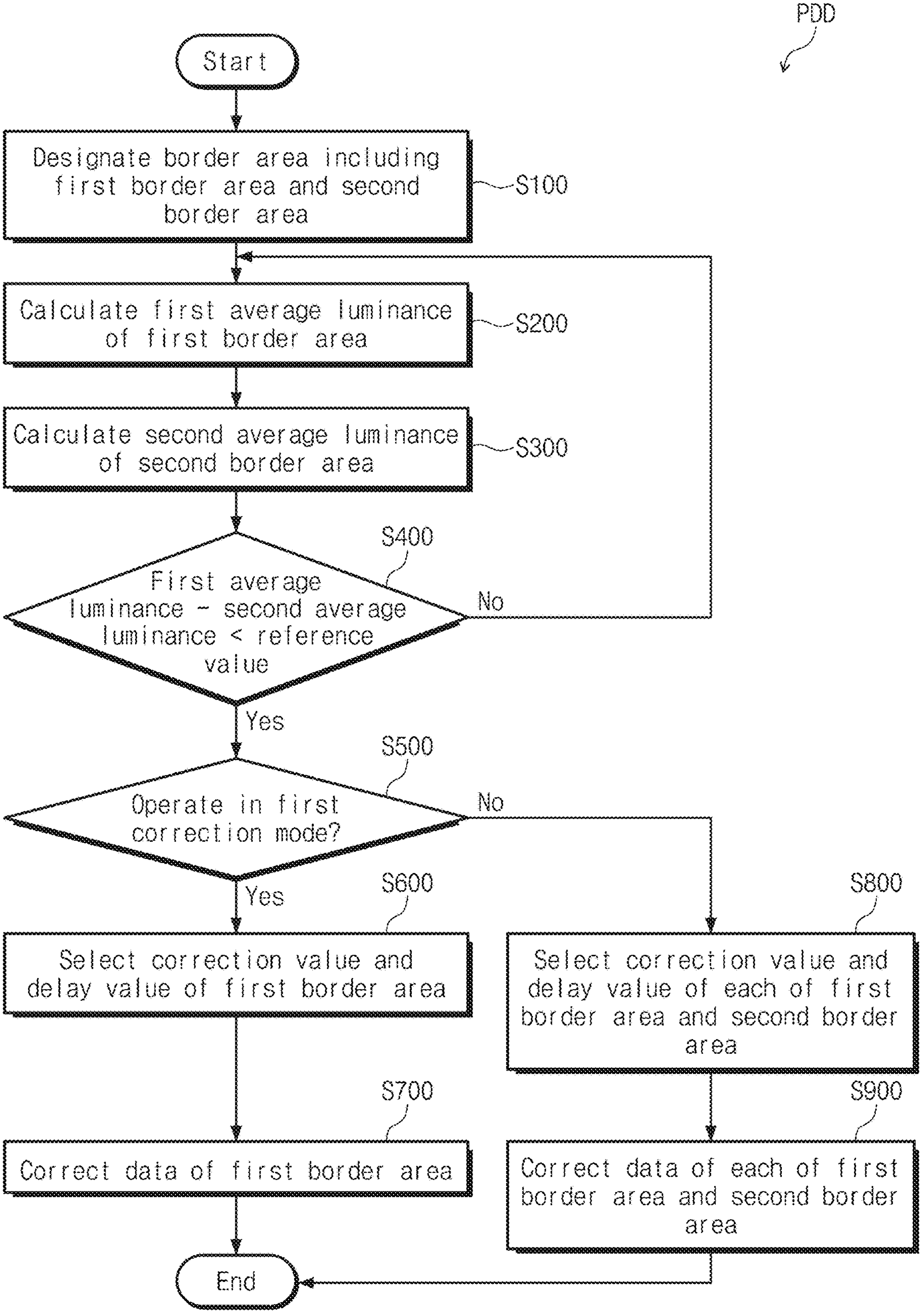
FIG. 6 is a flowchart illustrating a method for correcting data by a panel driver according to an embodiment of the inventive concept.
Figures 7, 8:
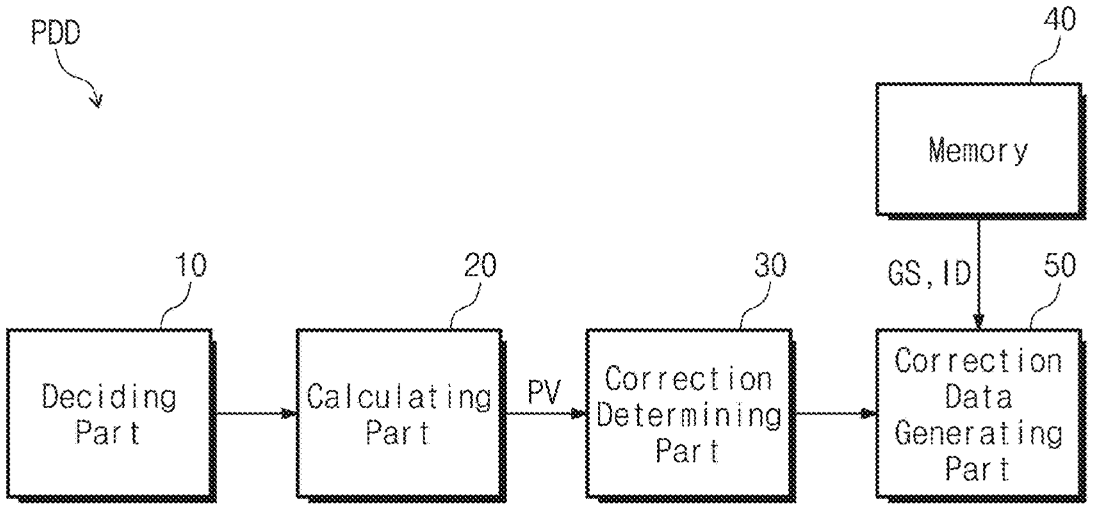
FIG. 7 is a block diagram illustrating components for data correction in a panel driver according to an embodiment of the inventive concept.
FIG. 8 is a table showing an example of a correction value stored in a memory according to an embodiment of the inventive concept.

FIG. 6 is a flowchart illustrating a method for correcting data by a panel driver PDD according to an embodiment of the inventive concept. FIG. 7 is a block diagram illustrating components for data correction in the panel driver PDD according to an embodiment of the inventive concept. FIG. 8 is a table showing an example of a correction value stored in a memory 40 according to an embodiment of the inventive concept.

Referring to FIGS. 5A, 5B, 6, and 7, the panel driver PDD may correct data so that a boundary BD due to a luminance difference is not visible to a driver and a passenger on a front passenger seat. For example, the panel driver PDD may correct the data so that, when a (1-1)-th type light emitting element ED1-1 of a first area DA-1 and a (2-2)-th type light emitting element ED2-2 of a second area DA-2 operate, a third pixel PXR3 of a border area DA-3 displays an intermediate luminance between a luminance of a first pixel PXR1 and a luminance of a second pixel PXR2.

Each of a (3-1)-th pixel PXR3-1 disposed in a first border area DA-3*a* and a (3-2)-th pixel PXR3-2 disposed in a second border area DA-3*b*, which are included in the third pixel PXR3, may be provided in plurality. Hereinafter, the (3-1)-th pixel PXR3-1 and the (3-2)-th pixel unit PXU3-2 are defined as a plurality of (3-1)-th pixels PXR3-1 and a plurality of (3-2)-th pixels PXR3-2, and are denoted by like reference numbers or symbols, respectively.

The panel driver PDD may include a deciding part 10, a calculating part 20, a correction determining part 30, a memory 40, and a correction data generating part 50. For example, the deciding part 10, the calculating part 20, the correction determining part 30, the memory 40, and the correction data generating part 50 may be included in a driving controller 100 or a data driver 200 of the panel driver PDD. In an embodiment of the inventive concept, a least some blocks may be omitted.

The deciding part 10 may designate the border area DA-3. The calculating part 20 may calculate a first average luminance of the (3-1)-th pixels PXR3-1 of the first border area DA-3*a* and a second average luminance of the (3-2)-th pixels PXR3-2 of the second border area DA-3*b*, and compute a difference value PV between the first average luminance and the second average luminance. The correction determining part 30 may determine whether or not to generate corrected data based on the difference value PV between the average luminances. The memory 40 may store information about a correction value and a delay value corresponding to the difference value PV between the average luminances. The correction data generating part 50 may decide an intermediate luminance based on the difference value PV between the average luminances, and generate the corrected data.

Referring to FIGS. 6 and 7, the deciding part 10 may designate the border area DA-3 including the first border area DA-3*a* and the second border area DA-3*b* (S100). For example, an area including N number of pixels (where N is an integer or 1 or more) of the (3-1)-th pixels PXR3-1 disposed in a direction from the boundary BD to the first area DA-1 may be designated as the first border area DA-3*a*, and an area including N number of pixels of the (3-2)-th pixels PXR3-2 disposed in a direction from the boundary BD to the second area DA-1 may be designated as the second border area DA-3*b*. Here, the numbers of the (3-1)-th pixels PXR3-1 and the (3-2)-th pixels PXR3-2, which are designated as the border area DA-3, may be the same, or alternatively may be different from each other.

The calculating part 20 may calculate a first average luminance of N number of (3-1)-th pixels PXR3-1 of the designated first border area DA-3*a* (S200). The calculating part 20 may calculate a second average luminance of N number of (3-2)-th pixels PXR3-2 of the designated second border area DA-3*b* (S300). Here, in the average luminance, for example, when N is 12, the first average luminance may be calculated by adding all of the luminances of twelve (3-1)-th pixels PXR3-1 of the first border area DA-3*a* and dividing the added value by 12. The calculating part 20 may calculate the difference value PV between the first average luminance and the second average luminance.

The correction determining part 30 may compare the difference value PV between the first average luminance and the second average luminance with a reference value PV_MAX (S400). The correction determining part 30 may compare the difference value PV between the first average luminance and the second average luminance with the reference value PV_MAX, and determine to generate corrected data when the difference value PV is less than the reference value PV_MAX. For example, an image displayed on the third display area DA3 in FIG. 2 is a continued image, and the difference value PV between the first average luminance of the (3-1)-th pixels PXR3-1 and the second average luminance of the (3-2)-th pixels PXR3-2 may be less than the reference value PV_MAX. Different gamma values may be applied to data provided to left and right areas divided on the basis of the boundary BD. Thus, even though the third display area DA3 displays the continued image, a luminance difference may occur, and thus the boundary BD of the third display area DA3 may be visible. According to an embodiment of the inventive concept, data provided to the border area DA-3 adjacent to the boundary BD of the third display area DA3 may be corrected, and thus the boundary BD may not be visible.

Alternatively, when the difference value PV between the first average luminance and the second average luminance is greater than the reference value PV_MAX, the correction determining part 30 may determine that a difference is caused by the displayed image itself, and thus a correction operation may not be performed. For example, as different images are displayed on the first display area DA1 and the second display area DA2 in FIG. 2, the difference value PV between the first average luminance of the (3-1)-th pixels PXR3-1 and the second average luminance of the (3-2)-th pixels PXR3-2 may be greater than the reference value PV_MAX. Here, the boundary BD may be determined to be due to a difference between the displayed images themselves, and the border area DA-3 adjacent to the boundary BD may not enter a correction mode. In this case, a corresponding horizontal line may not enter the correction mode, and a correction start stage for a next horizontal line may be performed. Here, the reference value PV_MAX may be predetermined to be stored, and a user may change the reference value PV_MAX.

Referring to FIGS. 6 and 7, when the correction determining part 30 determines to generate the corrected data, the correction data generating part 50 may determine whether to operate in a first correction mode or operate in a second correction mode (S500). In a case of the operation in the first correction mode, only data of the first border area DA-3*a* may be corrected. Alternatively, in a case of the operation in the second correction mode, data of both the first border area DA-3*a* and the second border area DA-3*b* may be corrected.

Referring to FIGS. 7 and 8, the panel driver PDD may further include the memory 40 in which the information about the correction value and the delay value corresponding to the difference value PV between the first average luminance and the second average luminance is stored.

The memory 40 may store an ID value ID including the information about a grayscale value GS, which is the correction value, and the delay value. In an embodiment, the memory 40 may store the difference value PV of about 0 to about 255 between the first average luminance and the second average luminance, and may store the reference value PV_MAX corresponding to the difference value PV. The reference value PV_MAX is a value for determining whether or not to perform correction, and in FIG. 8, a case in which the reference value PV_MAX is about 10 is described as an example. A case, in which the difference value PV is about 0, or about 10 or more, is not considered to require correction, and thus the grayscale value GS of about "0" and the ID value ID of about "0", each corresponding thereto, may be stored in the memory 40. The grayscale value GS of about "1" and the ID value ID of about "3", each corresponding to the difference value PV of about 1 to about 3, may be stored in the memory 40. The grayscale value GS of about "2" and the ID value ID of about "3", each corresponding to the difference value PV of about 4 to about 6, may be stored in the memory 40. The grayscale value GS of about "3" and the ID value ID of about "3", each corresponding to the difference value PV of about 7 to about 9, may be stored in the memory 40. The respective numerical values for the grayscale value GS and the ID value ID are just given as examples, and are not particularly limited to the foregoing examples.

The correction data generating part 50 may generate the corrected data based on the difference value PV between the first average luminance and the second average luminance, and on the grayscale value GS and the ID value ID that are stored in the memory 40. The correction data generating part 50 may correct the data by repeatedly decreasing or increasing the grayscale value GS according to the ID value ID stored in the memory 40.

In the case of the operation in the first correction mode, the grayscale value GS and the ID value ID may be read from the memory 40 to correct the data of the first border area DA-3*a* (S600). The correction data generating part 50 may correct the data based on the difference value PV between the first average luminance and the second average luminance, and on the information read from the memory 40. Here, as the luminance of the (3-1)-th pixels PXR3-1 disposed in the first border area DA-3*a* is greater than the luminance of the (3-2)-th pixels PXR3-2 disposed in the second border area DA-3*b*, the data may be corrected while gradually decreasing the luminance of the (3-1)-th pixels PXR3-1 disposed in the first border area DA-3*a* (S700). A corrected data value in the first border area DA-3*a* may be output to the (3-1)-th pixels PXR3-1 disposed in the first border area DA-3*a*.

In the case of the operation in the first correction mode, the correction data generating part 50 may all operate in the form of a decrease in the grayscale value GS. Thus, since the luminance of the first border area DA-3*a* is decreased by a certain level when the correction operation is applied, power consumption of the electronic device DD (see FIG. 1) may be reduced.

In the case of the operation in the second correction mode, the grayscale value GS and the ID value ID may be read from the memory 40 to correct the data of each of the first border area DA-3*a* and the second border area DA-3*b* (S800). The correction data generating part 50 may correct the data based on the difference value PV between the first average luminance and the second average luminance, and on the information read from the memory 40. As the luminance of the (3-1)-th pixels PXR3-1 disposed in the first border area DA-3*a* is greater than the luminance of the (3-2)-th pixels PXR3-2 disposed in the second border area DA-3*b*, the data may be corrected while gradually decreasing the luminance of the (3-1)-th pixels PXR3-1 disposed in the first border area DA-3*a* and gradually increasing the luminance of the (3-2)-th pixels PXR3-2 disposed in the second border area DA-3*b* (S900). A corrected data value in the first border area DA-3*a* may be output to the (3-1)-th pixels PXR3-1 disposed in the first border area DA-3*a*, and a corrected data value in the second border area DA-3*b* may be output to the (3-2)-th pixels PXR3-2 disposed in the second border area DA-3*b*.

In the case of the operation in the second correction mode, as the data of both the first border area DA-3*a* and the second border area DA-3*b* is corrected, an effect of preventing the boundary BD from being visible may be maximized. Thus, the electronic device DD (see FIG. 1) with improved display quality may be provided.

According to an embodiment of the inventive concept, the first pixel PXR1 disposed in the first area DA-1, the (3-1)-th pixels PXR3-1 disposed in the first border area DA-3*a*, the (3-2)-th pixels PXR3-2 disposed in the second border area DA-3*b*, and the second pixel PXR2 disposed in the second area DA-2 may be arranged in sequence along each of horizontal lines. Here, the correction operation may be performed for each horizontal line. The horizontal line may be a line extending in the second direction DR2.

According to an embodiment of the inventive concept, the data may not be corrected in a frame unit, but the data may be corrected in a horizontal line unit. Thus, data latency for correction may be of a few clock cycles, for example, at least two clock cycles. That is, the data latency for correction may be reduced. In the correction data generating part 50, when data correction is completed based on data corresponding to one horizontal line, the data correction for the corresponding horizontal line may be finished, and a data correction mode for a next horizontal line may be performed. For example, referring to FIG. 9, when data correction for a first horizontal line HR1 is completed, a data correction mode for a next horizontal line HR2 may be performed. Here, the data correction mode for the next horizontal line HR2 may be restarted from the calculating of the first average luminance of the first border area DA-3*a* in FIG. 6 (S200). As the operation for the luminance correction is performed in a unit of the horizontal lines HR1 and HR2 as above, the time for which a data output is delayed due to the correction may be minimized.

Figure 9:
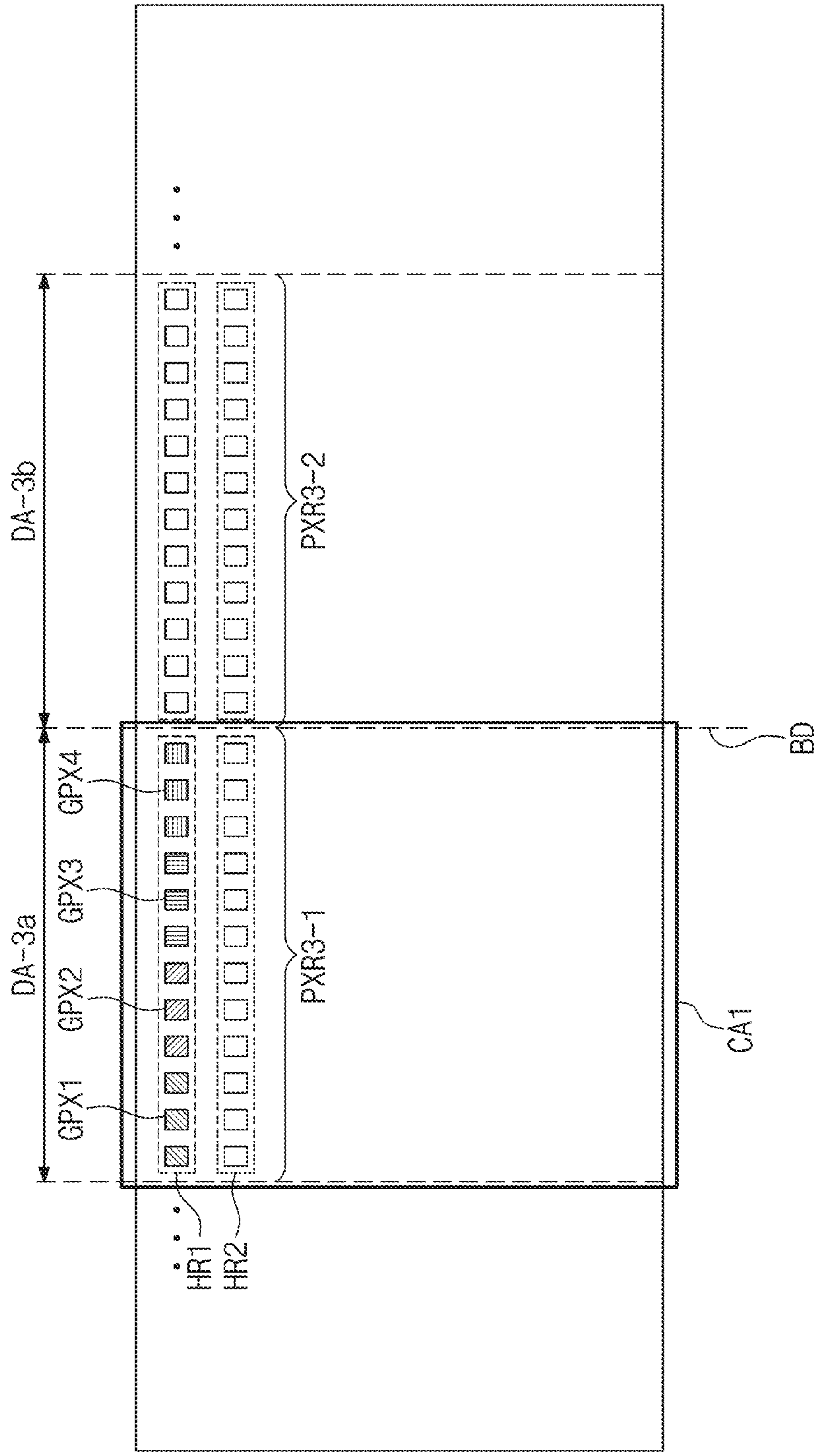
FIG. 9 is a plan view of an electronic device according to an embodiment of the inventive concept.
Figure 10A:
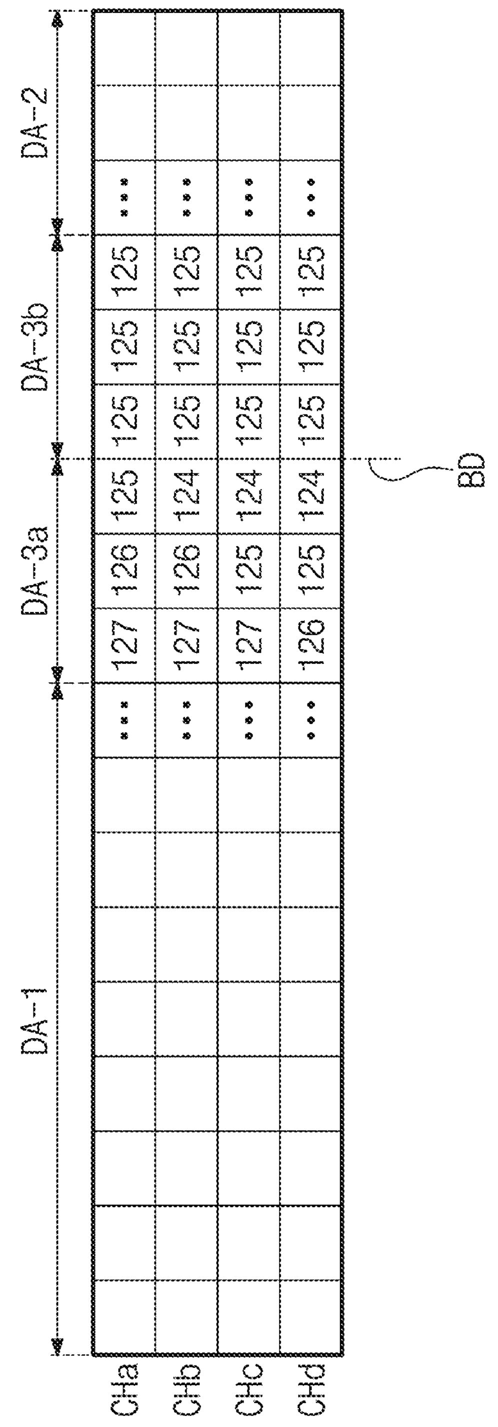
FIG. 10A is a table showing an example of corrected data according to an embodiment of the inventive concept.
Figure 10B:
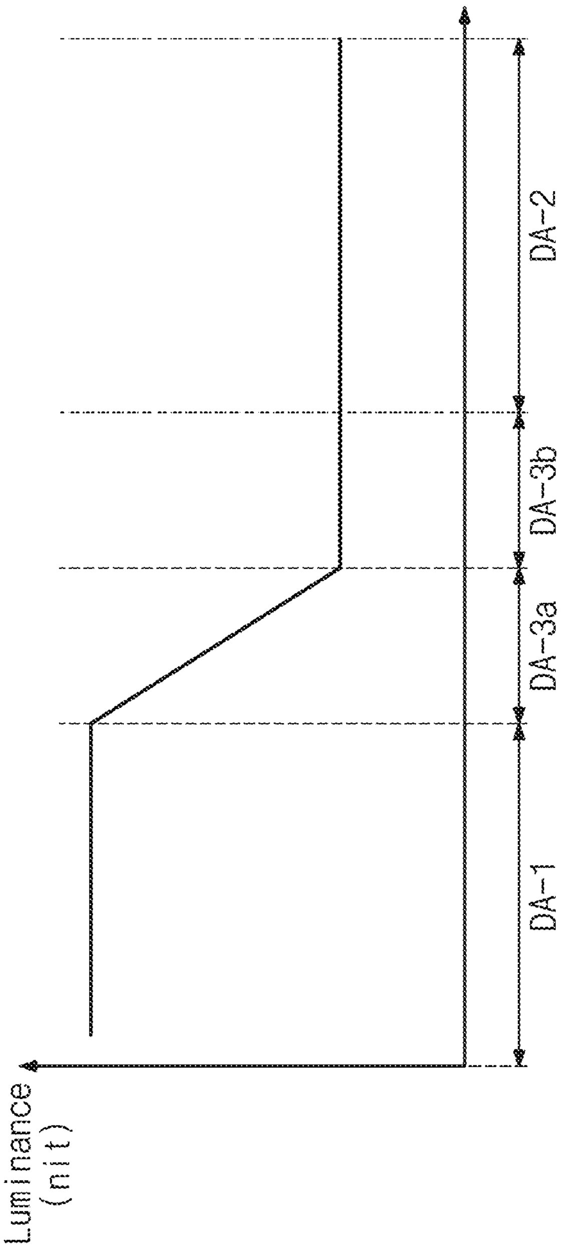
FIG. 10B is a graph showing an example of corrected data according to an embodiment of the inventive concept.

FIG. 9 is a plan view of an electronic device DD according to an embodiment of the inventive concept. FIG. 10A is a table showing an example of corrected data according to an embodiment of the inventive concept. FIG. 10B is a graph showing an example of corrected data according to an embodiment of the inventive concept.

Referring to FIGS. 7 and 9, the deciding part 10 may set the number of the (3-1)-th pixels PXR3-1 and the number of the (3-2)-th pixels PXR3-2, and designate the first border area DA-3*a* and the second border area DA-3*b*. In FIG. 9, as an example, the number of the (3-1)-th pixels PXR3-1 and the number of the (3-2)-th pixels PXR3-2 are each set to 12. Thus, the deciding part 10 may designate an area including twelve (3-1)-th pixels PXR3-1 as the first border area DA-3*a*, and designate an area including twelve (3-2)-th pixels PXR3-2 as the second border area DA-3*b*.

The calculating part 20 may calculate a first average luminance of the twelve (3-1)-th pixels PXR3-1 and a second average luminance of the twelve (3-2)-th pixels PXR3-2, and then compute a difference value PV between the first average luminance and the second average luminance. For example, referring to FIG. 10A, the first average luminance may be about 100 nit, and an average grayscale value GS corresponding thereto may be about 127. And the second average luminance may be about 98 nit, and an average grayscale value GS corresponding thereto may be about 125. The difference value PV between the corresponding average luminances may be represented by a difference between the grayscale values GS, and in the example above, the difference value PV between the average luminances may be about 2.

Referring to FIG. 8 together, the correction determining part 30 may compare the predetermined reference value PV_MAX and the difference value PV, and then determine to generate correction data when the difference value PV is about 2. When the difference value PV is about 2 through the grayscale value GS and the ID value ID prestored in the memory 40, the correction data generating part 50 may read data that is the grayscale value GS of about "1" and the ID value ID of about "3" from the memory 40.

In an embodiment of the inventive concept, referring to FIGS. 9 and 10A, the correction data generating part 50 may be operated in a first correction mode. In the first correction mode, a first correction area CA1 including the first border area DA-3*a* may be determined as an area to be corrected. Thus, the correction data generating part 50 may correct the data while repeatedly decreasing the grayscale value GS of the first border area DA-3*a* by about 1 so that the luminance is gradually changed. A corrected data value may be output to the (3-1)-th pixels PXR3-1 disposed in the first border area DA-3*a*. When the data correction is completed, the data correction for a first line HR1 may be finished, and a data correction mode for a second line HR2 may be performed.

For example, based on an assumption that the difference value PV is about 2, the correction data generating part 50 may read the grayscale value GS of about "1" and the ID value ID of about "3" from the memory 40. The ID value ID includes information about a delay value. Thus, in a case in which the ID value ID is about "3", data before correction may be output as it is for first-group pixels GPX1 including three pixels arranged adjacent to the first area DA-1.

The correction data generating part 50 may output data by decreasing the grayscale value GS of the data by about 1 for second-group pixels GPX2 having the number corresponding to the ID value ID, then output data by decreasing the grayscale value GS of the data by about 2 for third-group pixels GPX3 having the number corresponding to the ID value ID, and then output data by decreasing the grayscale value GS of the data by about 3 for fourth-group pixels GPX4 having the number corresponding to the ID value ID.

Each of the grayscale values GS corresponding to twelve pixels disposed on one horizontal line of the first border area DA-3*a* before correction may be about 127. Referring to FIG. 10A, corrected grayscale values GS corresponding to the twelve pixels disposed on the one horizontal line of the first border area DA-3*a*, and grayscale values GS corresponding to twelve pixels disposed on the one horizontal line of the second border area DA-3*b* are set forth.

The corrected grayscale values GS may be input into "X" number of channels. The "X" number of channels may be one or more, and as the number of the channels decreases, the delay time may be minimized. In an embodiment of the inventive concept, an example in which X is "4" is illustrated. The corrected data may be output through four channels CHa, CHb, CHc and CHd. For example, in order of first to fourth channels CHa, CHb, CHc and CHd, the data may be provided to the (3-1)-th pixel PXR3-1 arranged in a direction from the first area DA-1 toward the boundary BD. Thus, 127, 127, 127, 126, 126, 126, 125, 125, 125, 124, 124, and 124 may be sequentially provided to the (3-1)-th pixel PXR3-1.

Referring to FIGS. 5B and 10B, the first pixel PXR1 disposed in the first area DA-1 may have the highest luminance, the data may be corrected in the first border area DA-3*a*, and the luminance of the first border area DA-3*a* may be gradually decreased. As the luminance of the (3-1)-th pixels PXR3-1 disposed in the first border area DA-3*a* is gradually decreased, the (3-1)-th pixels PXR3-1 may have the luminance similar to the luminance of the (3-2)-th pixels PXR3-2 disposed in the second border area DA-3*b*. Due to the data correction for the first border area DA-3*a*, the boundary BD having been visible due to a luminance difference may not be visible to a user.

Figure 11:
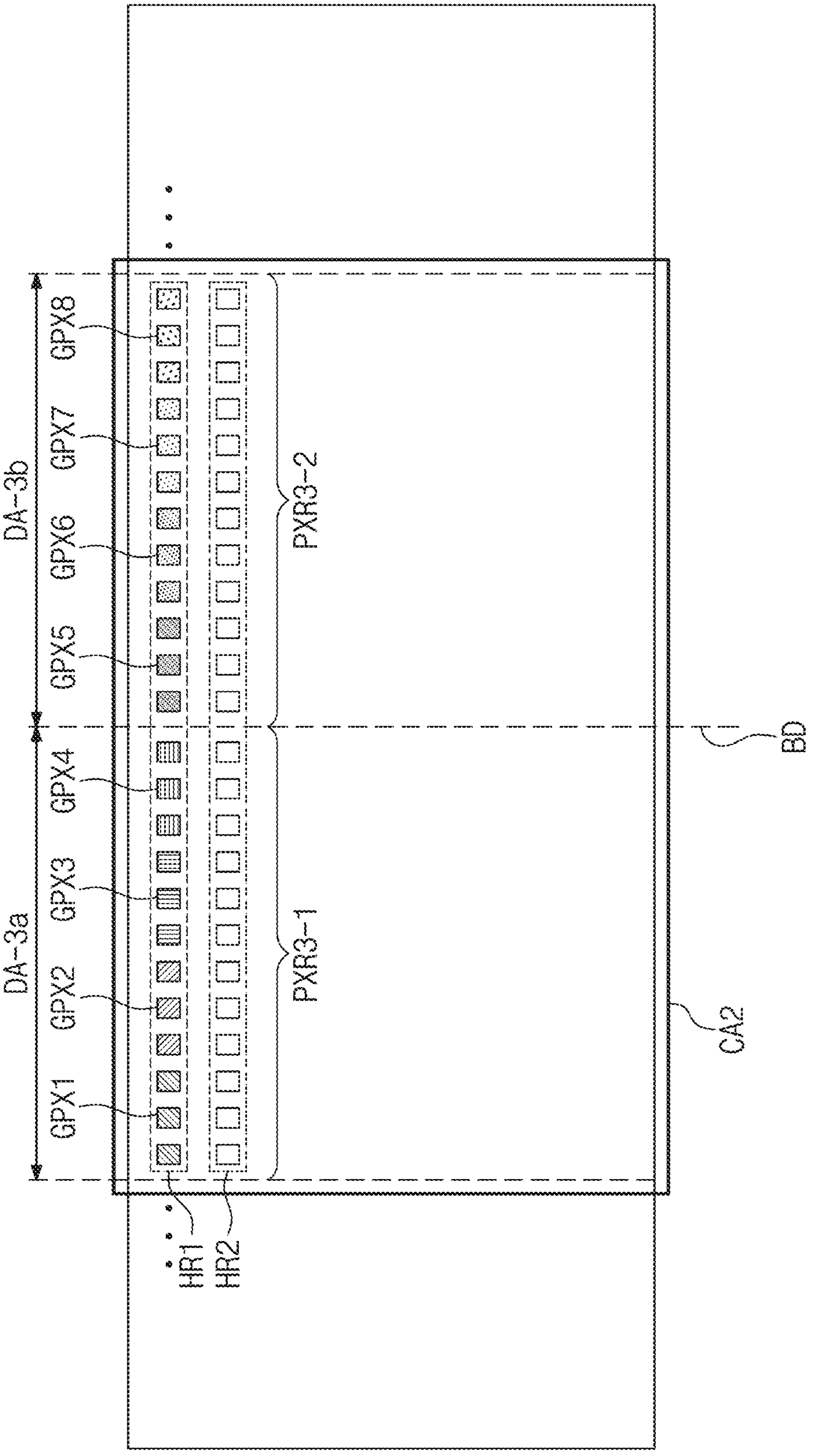
FIG. 11 is a plan view of an electronic device according to an embodiment of the inventive concept.
Figure 12A:
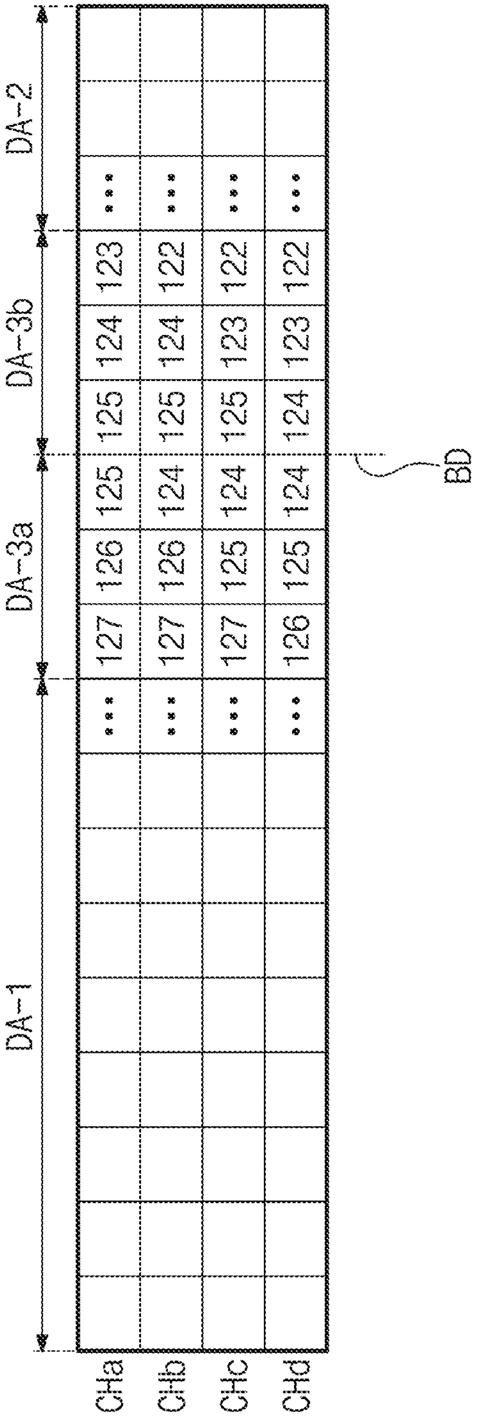
FIG. 12A is a table showing an example of corrected data according to an embodiment of the inventive concept.
Figure 12B:
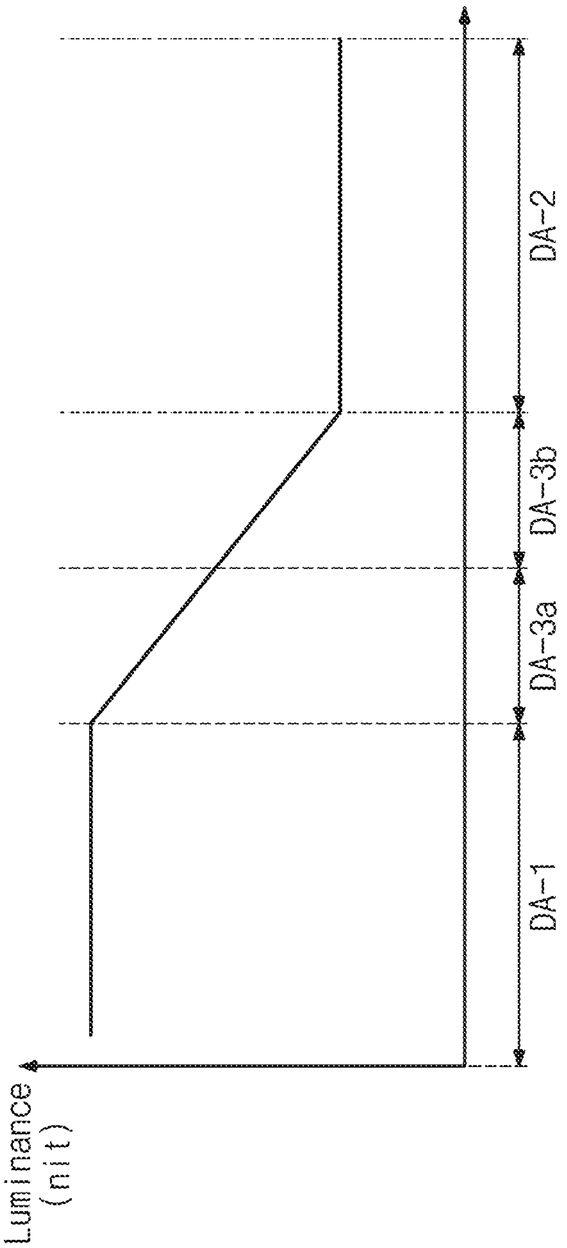
FIG. 12B is a graph showing an example of corrected data according to an embodiment of the inventive concept.

FIG. 11 is a plan view of an electronic device DD according to an embodiment of the inventive concept. FIG. 12A is a table showing an example of corrected data according to an embodiment of the inventive concept. FIG. 12B is a graph showing an example of corrected data according to an embodiment of the inventive concept.

Referring to FIGS. 9, 11, and 12A, a calculating part 20 may calculate a difference value PV between a first average luminance and a second average luminance. For example, the first average luminance may be about 100 nit, and an average grayscale value GS corresponding thereto may be about 127. And the second average luminance may be about 95 nit, and an average grayscale value GS corresponding thereto may be about 123. As described above, the difference value PV between the average luminances may be represented by a difference between grayscale values GS. Thus, in the example above, the difference value PV between the average luminances may be about 4.

Referring to FIGS. 11 and 12A, a correction data generating part 50 may be operated in a second correction mode. In the second correction mode, a second correction area CA2 including the first border area DA-3*a* and the second border area DA-3*b* may be determined as an area to be corrected.

As being operated in the second correction mode, the correction data generating part 50 may read, from a memory 40, a grayscale value GS and an ID value ID that are different from those in the first correction mode described above. For example, when the number of pixels to be corrected is increased by twice, N may be 24, the grayscale value GS may be about "1", and the ID value ID may be about "3". Thus, the correction data generating part 50 may correct the data while repeatedly decreasing the grayscale value GS of the first border area DA-3*a* by about 1 for each of first- to fourth-group pixels GPX1, GPX2, GPX3 and GPX4 so that the luminance is gradually changed. The correction data generating part 50 may also correct data while repeatedly decreasing the grayscale value GS of the second border area DA-3*b* by about 1 for each of fifth- to eighth-group pixels GPX5, GPX6, GPX7 and GPX8.

Here, in the luminance, the data may be corrected while repeatedly increasing the grayscale value GS by about 1 so that the luminance is gradually changed, when viewed in a direction from the eighth-group pixels GPX8, which include three pixels arranged adjacent to the second area DA-2, to the fifth-group pixels GPX5 which include three pixels arranged adjacent to the boundary BD.

The corrected data may be output to the (3-1)-th pixels PXR3-1 disposed in the first border area DA-3*a*, and the corrected data may be output to the (3-2)-th pixels PXR3-2 disposed in the second border area DA-3*b*. When the data correction is completed, the data correction for a first line HR1 may be finished, and a data correction mode for a second line HR2 may be performed.

Referring to FIGS. 5B and 12B, the first pixel PXR1 disposed in the first area DA-1 may have the highest luminance, the data may be corrected in the first border area DA-3*a*, and the luminance of the (3-1)-th pixels PXR3-1 disposed in the first border area DA-3*a* may be gradually decreased. In addition, the data may be corrected also in the second border area DA-3*b*, and the luminance of the (3-2)-th pixels PXR3-2 disposed in the second border area DA-3*b* may be gradually increased in a direction from the second border area DA-3*b* to the boundary BD. Due to the data correction for the first border area DA-3*a* and the second border area DA-3*b*, the boundary BD having been visible due to the luminance difference may not be visible to a user.

In an embodiment of the inventive concept, as the data of the first border area DA-3*a* is corrected while repeatedly decreasing the data so that the luminance is gradually changed, a corrected data value may be theoretically negative. For example, when the grayscale value GS corresponding to the first average luminance is about 5, and the grayscale value GS corresponding to the second average luminance is about 0, the difference value PV between the average luminances, which may be represented by a difference between the grayscale values GS, may be about 5. In a case in which a memory 40 in which information for correcting the data is stored has the grayscale value GS of about "2" and the ID value ID of about "3" each corresponding to the difference value PV of about 5 between the average luminances, the corrected data value may be theoretically negative as being adjacent to the boundary BD. Thus, in a case in which the corrected data value is negative, correction may be set to be no more performed on the corresponding horizontal line.

According to the embodiment of the inventive concept described above, the pixels disposed in the divided display areas may operate in the different modes, for example, the first mode or the second mode. The luminance difference occurring when the pixels operate in the different modes for each of the divided display areas may not be visible to the user through the data correction. Thus, the electronic device with the improved display quality may be provided. For example, upon the correction to decrease the grayscale value of the border area, the boundary in the display area may not be visible, and also the power consumption of the electronic device may be reduced. Alternatively, in the case in which the correction to decrease the grayscale value of the first border area and the correction to increase the grayscale value of the second border area are performed at the same time, the effect of preventing the boundary in the display area from being visible may be maximized.

Although the embodiments of the present invention have been described, it is understood that the present invention should not be limited to these embodiments but various changes and modifications can be made by one ordinary skilled in the art within the spirit and scope of the present invention as hereinafter claimed. Therefore, the technical scope of the inventive concept is not limited to the contents described in the detailed description of the specification, but should be determined by the claims.

What is claimed is:

1. An electronic device comprising:

a display panel in which a first area, a second area, and a border area between the first area and the second area are defined; and a panel driver configured to drive the display panel, wherein the display panel comprises:

a first pixel disposed in the first area and comprising a first pixel circuit, a (1-1)-th type light emitting element electrically connected to the first pixel circuit, and a (2-1)-th type light emitting element electrically connected to the first pixel circuit;

a second pixel disposed in the second area and comprising a second pixel circuit, a (1-2)-th type light emitting element electrically connected to the second pixel circuit, and a (2-2)-th type light emitting element electrically connected to the second pixel circuit; and a third pixel disposed in the border area and comprising a third pixel circuit, a (1-3)-th type light emitting element electrically connected to the third pixel circuit, and a (2-3)-th type light emitting element electrically connected to the third pixel circuit, wherein, when the (1-1)-th type light emitting element of the first area operates, and the (2-2)-th type light emitting element of the second area operates, the panel driver corrects data so that the third pixel displays an intermediate luminance between a luminance of the first pixel and a luminance of the second pixel, and outputs corrected data to the third pixel, wherein the border area comprises a first border area and a second border area, wherein the third pixel is one of a plurality of third pixels, and the plurality of third pixels comprise a plurality of (3-1)-th pixels disposed in the first border area, and a plurality of (3-2)-th pixels disposed in the second border area, wherein the panel driver comprises:

a calculating part configured to calculate a first average luminance of the plurality of (3-1-th) pixels of the first border area and a second average luminance of the plurality of (3-2)-th pixels of the second border area, and compute a difference value between the first average luminance and the second average luminance; and a memory configured to store a correction value corresponding to the difference value between the first average luminance and the second average luminance, and wherein the memory further stores an ID value comprising information about a delay value corresponding to the difference value between the first average luminance and the second average luminance.

2. The electronic device of claim 1, wherein each of the first area, the second area, and the border area is selectively driven in a first mode or a second mode, wherein, in an area driven in the first mode, the (1-1)-th type light emitting element, the (1-2)-th type light emitting element, or the (1-3)-th type light emitting element operate, and the (2-1)-th type light emitting element, the (2-2)-th type light emitting element, or the (2-3)-th type light emitting element do not operate, wherein, in an area driven in the second mode, the (1-1)-th type light emitting element, the (1-2)-th type light emitting element, or the (1-3)-th type light emitting element do not operate, and the (2-1)-th type light emitting element, the (2-2)-th type light emitting element, or the (2-3)-th type light emitting element operate.

3. The electronic device of claim 1, wherein the first area and the first border area are driven in a first mode, and the second area and the second border area are driven in a second mode.

4. The electronic device of claim 3, wherein, when the first border area is driven in the first mode, the (1-3)-th type light emitting element of each of the plurality of (3-1)-th pixels operates, and when the second border area is driven in the second mode, the (2-3)-th type light emitting element of each of the plurality of (3-2)-th pixels operates.

5. The electronic device of claim 3, wherein the panel driver corrects data so that the plurality of (3-1)-th pixels display the intermediate luminance between the luminance of the first pixel and the luminance of the second pixel, and outputs the corrected data to the plurality of (3-1)-th pixels.

6. The electronic device of claim 3, wherein the panel driver corrects data so that the plurality of (3-2)-th pixels display the intermediate luminance between the luminance of the first pixel and the luminance of the second pixel, and outputs the corrected data to the plurality of (3-2)-th pixels.

7. The electronic device of claim 3, wherein the panel driver further comprises:

a deciding part configured to designate the border area; and a correction data generating part configured to determine the intermediate luminance based on the difference value between the first average luminance and the second average luminance, and generate the corrected data.

8. The electronic device of claim 7, wherein the panel driver further comprises a correction determining part configured to determine whether or not to generate the corrected data based on the first average luminance and the second average luminance.

9. The electronic device of claim 1, wherein a surface area of a first light emitting area defined in the (1-1)-th type light emitting element is greater than a surface area of a second light emitting area defined in the (2-1)-th type light emitting element.

10. An electronic device comprising:

a display panel in which a first area, a second area, and a border area between the first area and the second area are defined; and a panel driver configured to drive the display panel, wherein the display panel comprises a plurality of horizontal lines, each of the plurality of horizontal lines includes a first pixel disposed in the first area, a second pixel disposed in the second area, and a plurality of third pixels disposed in the border area, wherein the first pixel, the plurality of third pixels, and the second pixel are arranged in sequence along each of the plurality of horizontal lines, wherein the panel driver corrects data for each of the plurality of horizontal lines so that, in each of the plurality of horizontal lines, the plurality of third pixels display an intermediate luminance between a luminance of the first pixel driven in a first mode and a luminance of the second pixel driven in a second mode different from the first mode, and outputs corrected data to the plurality of third pixels, wherein, when data correction for one of the plurality of horizontal lines is completed, the panel driver enters a data correction mode for a next horizontal line, wherein the border area comprises a first border area and a second border area, wherein the plurality of third pixels comprise a plurality of (3-1)-th pixels disposed in the first border area, and a plurality of (3-2) th pixels disposed in the second border area, wherein the panel driver comprises:

a calculating part configured to calculate a first average luminance of the plurality of (3-1)-th pixels and a second average luminance of the plurality of (3-2)-th pixels, and compute a difference value between the first average luminance and the second average luminance; and a memory configured to store a correction value corresponding to the difference value between the first average luminance and the second average luminance, and wherein the memory further stores an ID value comprising information about a delay value corresponding to the difference value between the first average luminance and the second average luminance.

11. The electronic device of claim 10, wherein the first pixel comprises a (1-1)-th type light emitting element and a (2-1)-th type light emitting element, the second pixel comprises a (1-2)-th type light emitting element and a (2-2)-th type light emitting element, and the plurality of third pixels comprise a (1-3)-th type light emitting element and a (2-3)-th type light emitting element, wherein each of the first area, the second area, and the border area is selectively driven in the first mode or the second mode, wherein, in an area driven in the first mode, the (1-1)-th type light emitting element, the (1-2)-th type light emitting element, or the (1-3)-th type light emitting element operate, and the (2-1)-th type light emitting element, the (2-2)-th type light emitting element, or the (2-3)-th type light emitting element do not operate, and wherein, in an area driven in the second mode, the (1-1)-th type light emitting element, the (1-2)-th type light emitting element, or the (1-3)-th type light emitting element do not operate, and the (2-1)-th type light emitting element, the (2-2)-th type light emitting element, or the (2-3)-th type light emitting element operate.

12. The electronic device of claim 11, wherein each of the plurality of (3-1)-th pixels comprises a (3-1)-th pixel circuit, and a (1-3a)-th type light emitting element and a (2-3a)-th type light emitting element each electrically connected to the (3-1)-th pixel circuit, wherein each of the plurality of (3-2)-th pixels comprises a (3-2)-th pixel circuit, and a (1-3b)-th type light emitting element and a (2-3b)-th type light emitting element each electrically connected to the (3-2)-th pixel circuit.

13. The electronic device of claim 12, wherein the first area and the first border area are driven in the first mode, and the second area and the second border area are driven in the second mode, wherein, when the first border area is driven in the first mode, the (1-3a)-th type light emitting element of each of the plurality of (3-1)-th pixels operates, and when the second border area is driven in the second mode, the (2-3b)-th type light emitting element of each of the plurality of (3-2)-th pixels operates. (2-3b)-th type light emitting element of each of the plurality of (3-2)-th pixels operates.

14. The electronic device of claim 13, wherein the panel driver corrects data for each of the plurality of horizontal lines so that the plurality of (3-1)-th pixels display the intermediate luminance between the luminance of the first pixel and the luminance of the second pixel, and outputs the corrected data to the plurality of (3-1)-th pixels.

15. The electronic device of claim 13, wherein the panel driver corrects data for each of the plurality of horizontal lines so that the plurality of (3-2)-th pixels display the intermediate luminance between the luminance of the first pixel and the luminance of the second pixel, and outputs the corrected data to the plurality of (3-2)-th pixels.

16. The electronic device of claim 13, wherein the panel driver further comprises:

a deciding part configured to designate the border area; and a correction data generating part configured to determine the intermediate luminance based on the difference value between the first average luminance and the second average luminance, and generate the corrected data.

17. The electronic device of claim 16, wherein the panel driver further comprises a correction determining part configured to determine whether or not to generate the corrected data based on the first average luminance and the second average luminance.

* * * * *